United States Patent
Amaki et al.

(10) Patent No.: US 12,293,106 B2
(45) Date of Patent: May 6, 2025

(54) STORAGE DEVICE, STORAGE SYSTEM, AND CONTROL METHOD

(71) Applicant: Kioxia Corporation, Tokyo (JP)

(72) Inventors: Takehiko Amaki, Yokohama (JP);
Shunichi Igahara, Fujisawa (JP);
Toshikatsu Hida, Yokohama (JP);
Yoshihisa Kojima, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 182 days.

(21) Appl. No.: 17/447,088

(22) Filed: Sep. 8, 2021

(65) Prior Publication Data
US 2022/0300185 A1    Sep. 22, 2022

(30) Foreign Application Priority Data
Mar. 17, 2021    (JP) ................................ 2021-043650

(51) Int. Cl.
G06F 3/06        (2006.01)
(52) U.S. Cl.
CPC .......... *G06F 3/0652* (2013.01); *G06F 3/0625* (2013.01); *G06F 3/064* (2013.01); *G06F 3/0659* (2013.01); *G06F 3/0679* (2013.01)
(58) Field of Classification Search
CPC ...... G06F 3/0625; G06F 3/064; G06F 3/0659; G06F 3/0679; G06F 3/0652
USPC ....................................................... 711/103
See application file for complete search history.

(56) References Cited

U.S. PATENT DOCUMENTS

| | | | |
|---|---|---|---|
| 9,934,151 B2 | 4/2018 | Kan | |
| 10,372,342 B2 | 8/2019 | Dusija et al. | |
| 10,379,782 B2 | 8/2019 | Nagarajan et al. | |
| 2014/0281338 A1* | 9/2014 | Choi | G06F 3/0688 711/170 |
| 2015/0169443 A1* | 6/2015 | Lee | G06F 12/0246 711/103 |
| 2017/0371794 A1* | 12/2017 | Kan | G06F 3/061 |
| 2018/0211708 A1* | 7/2018 | Igahara | G11C 16/105 |
| 2019/0034330 A1* | 1/2019 | Natarajan | G11C 29/021 |
| 2019/0354476 A1* | 11/2019 | Park | G06F 3/0608 |
| 2021/0117118 A1* | 4/2021 | Stoica | G06F 3/0604 |
| 2021/0141561 A1* | 5/2021 | Kale | G06F 3/0659 |

OTHER PUBLICATIONS

JEDEC Solid State Technology Association, "JEDEC Standard, Universal Flash Storage (UFS)", Version 2.2, (JESD220C-2.2) Aug. 2020, 396 pages.

* cited by examiner

*Primary Examiner* — Gautam Sain
(74) *Attorney, Agent, or Firm* — Oblon, McClelland, Maier & Neustadt, L.L.P.

(57) ABSTRACT

According to one embodiment, a storage device comprises a nonvolatile memory, and a controller configured to perform a first data write operation in a first mode, and to perform a second data write operation in a second mode. Data of a first number of bits is written per memory cell in the first mode. Data of a second number of bits is written per memory cell in the second mode. The second number is larger than the first number. The controller reserves one or more free blocks as write destination block candidates of the first data write operation, perform the first data write operation for one of the write destination block candidates, and perform a garbage collection.

42 Claims, 15 Drawing Sheets

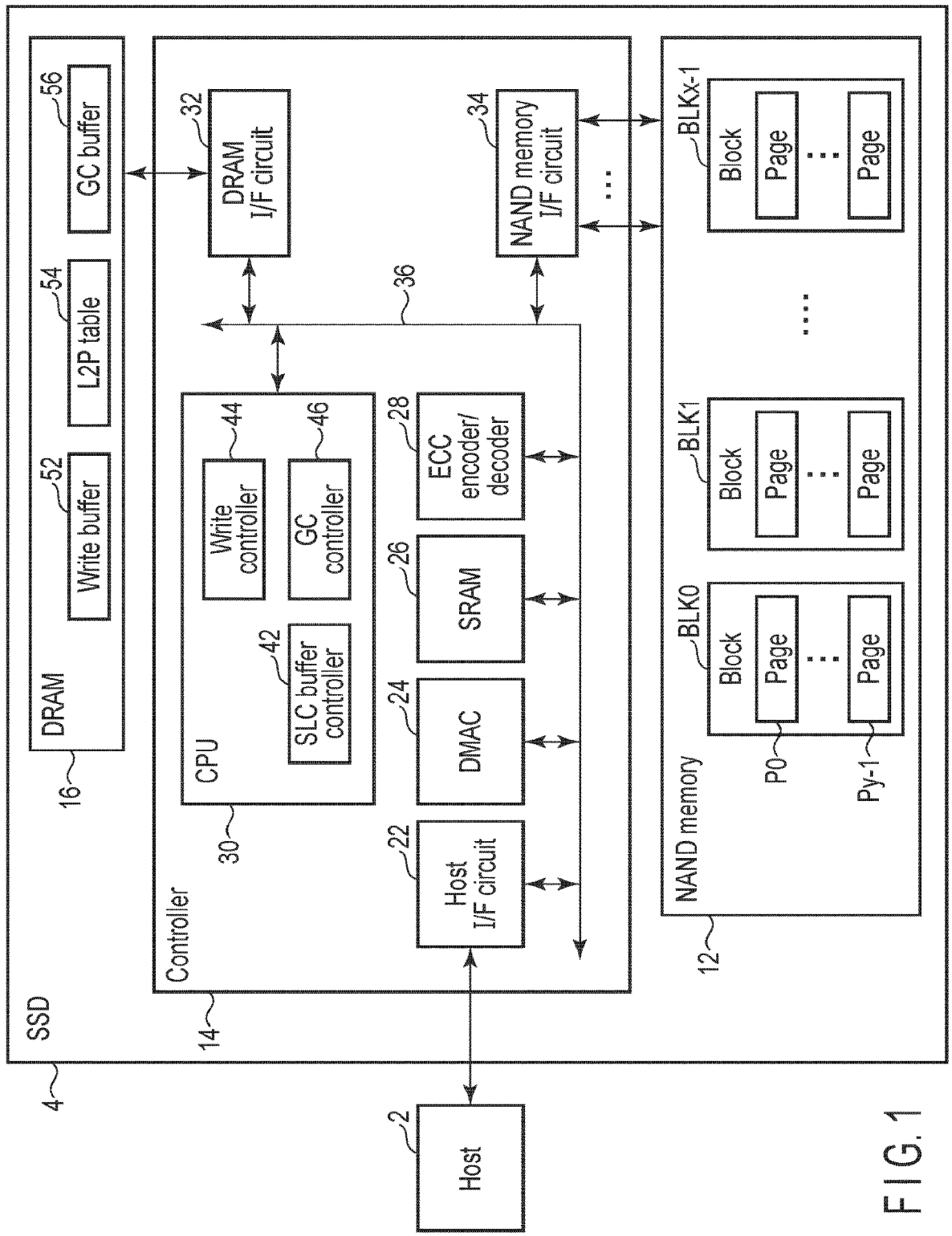
F I G. 1

| Category | Item | Setting example |
|---|---|---|
| SLC buffer reservation parameter | Maximum size of SLC buffer | X(GiB) |
| | SLC buffer reservation size | Y(GiB) if total size of free blocks is X(GiB) or more, or Y(GiB) if total size of free blocks is less than X(GiB) |
| SLC buffer recovery parameter | Recovery in active idle period | Perform recovery(Enable), or Not perform recovery (Disable) |
| | Recovery in standby entry period | Perform recovery until size of active area of SLC buffer becomes 0, Perform recovery until total size of free blocks becomes X(GiB) or more, or Not perform recovery (Disable) |
| | Recovery in LPM entry period | Perform recovery until size of active area of SLC buffer becomes zero, Perform recovery until total size of free blocks becomes X(GiB) or more, Perform recovery for X(seconds) after LPM transition completion response, Perform recovery with maintaining power consumption less than X(mW) after LPM transition completion response, or Not perform recovery (Disable) |
| | Recovery in LPM period | Perform recovery while power is supplied to whole part of SSD 4 every X seconds, Perform recovery with maintaining average power less than X(mW), or Not perform recovery (Disable) |
| | Recovery in TLC write operation period | Perform recovery with maintaining TLC write performance at X(%) or more, or Not perform recovery (Disable) |
| | Recovery in SLC write operation period | Perform recovery with maintaining SLC write performance at X(%) or more, or Not perform recovery (Disable) |

F I G. 3

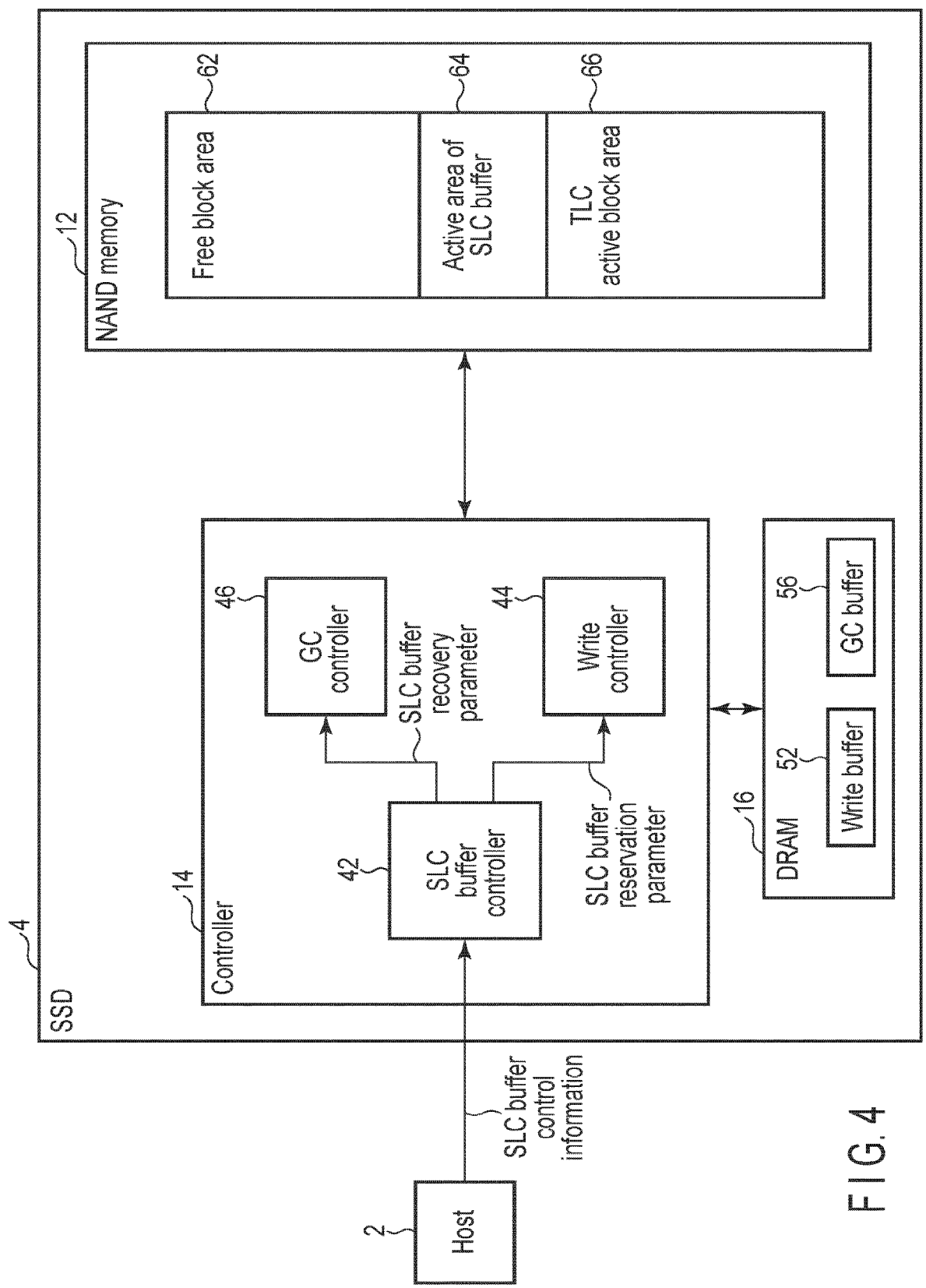
F I G. 4

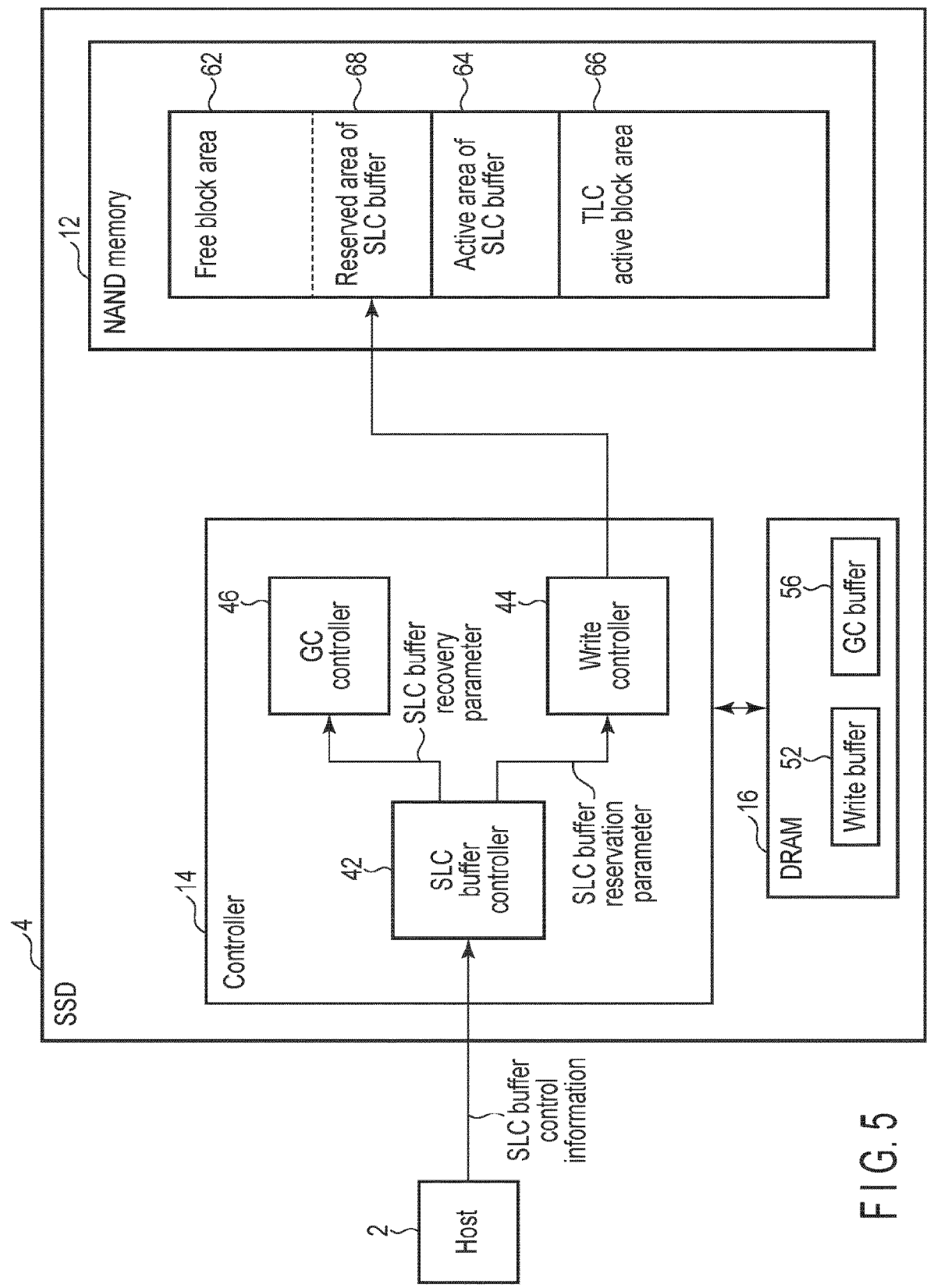
F I G. 5

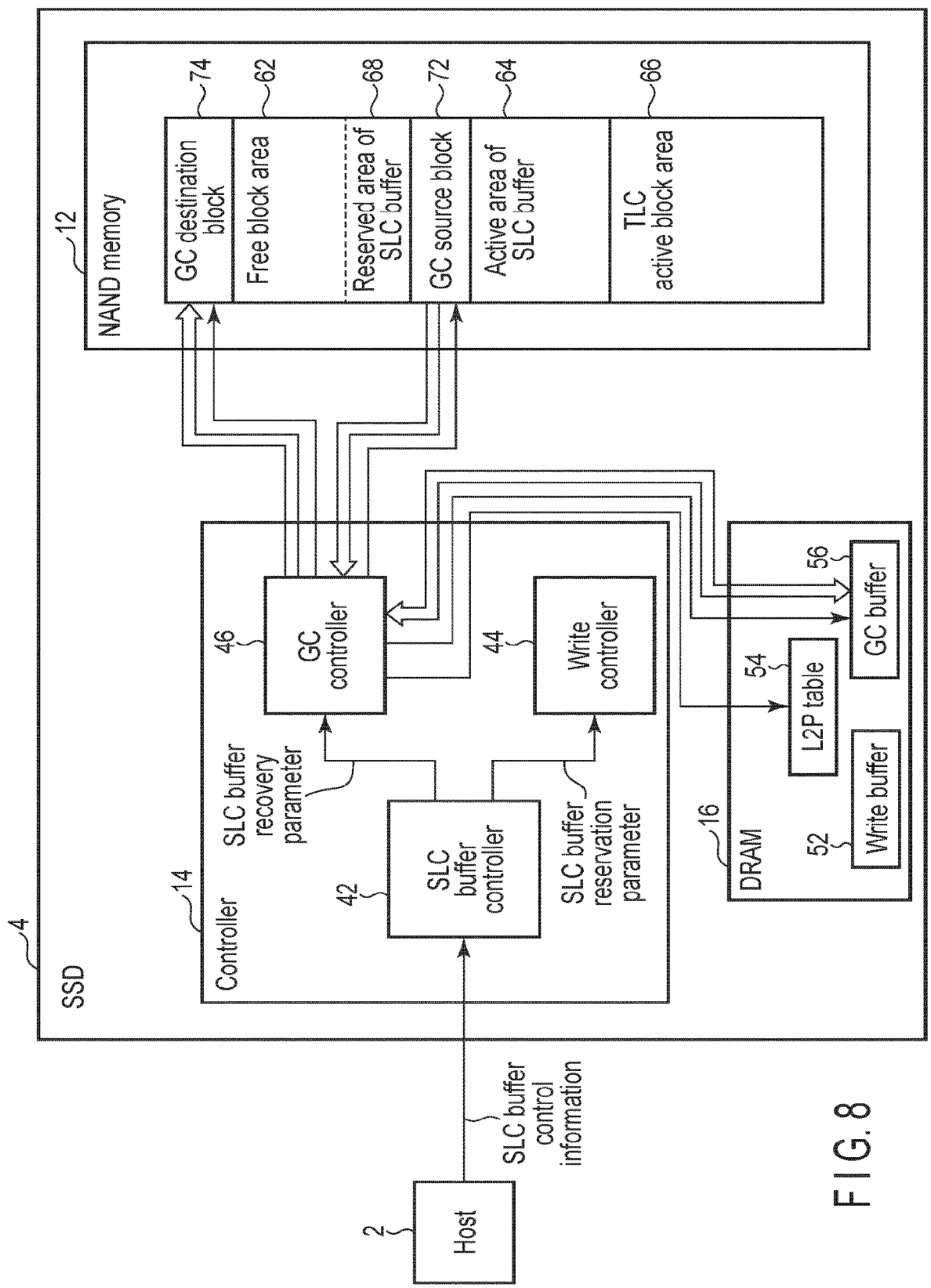
F I G. 8

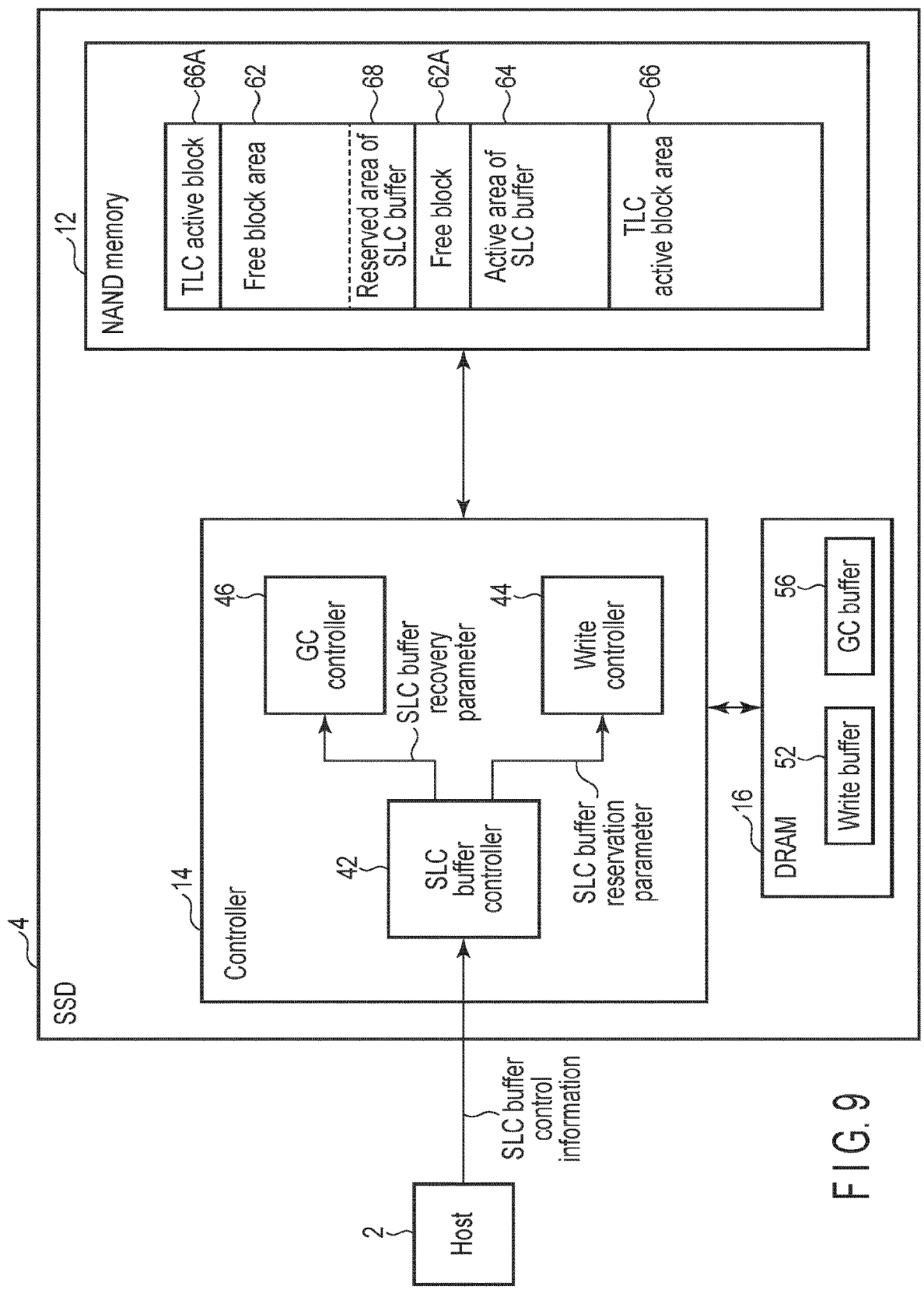
F I G. 9

| Category | Item | Setting example 1 (Aggressive package) | Setting example 2 (Moderate package) | Setting example 3 (Passive package) |
|---|---|---|---|---|
| SLC buffer reservation parameter | Maximum size of SLC buffer | 80GiB | 10GiB | 2.5GiB |
| | SLC buffer reservation size | 80GiB if total size of free blocks is 128GiB or more, or 80GiB if total size of free blocks is less than 128GiB | 10GiB if total size of free blocks is 128GiB or more, or 2.5GiB if total size of free blocks is less than 128GiB | 2.5GiB if total size of free blocks is 128GiB or more, or 2.5GiB if total size of free blocks is less than 128GiB |
| SLC buffer recovery parameter | Recovery in active idle period | Perform recovery (Enable) | Perform recovery (Enable) | Perform recovery (Enable) |
| | Recovery in standby entry period | Perform recovery until size of active area of SLC buffer becomes 0 | Perform recovery until size of active area of SLC buffer becomes 0 | Perform recovery until size of active area of SLC buffer becomes 0 |
| | Recovery in LPM entry period | Perform recovery until size of active area of SLC buffer becomes 0 | Perform recovery until the size of free blocks is 5GiB or more | Not perform (Disable) |
| | Recovery in LPM period | Not perform recovery (Disable) | Perform recovery while power is supplied to whole part of SSD 4 every 5 seconds | Not perform (Disable) |
| | Recovery in TLC write operation period | Perform recovery with maintaining TLC write performance at 80% or more | Perform recovery with maintaining TLC write performance at 90% or more | Not perform (Disable) |
| | Recovery in SLC write operation period | Perform recovery with maintaining SLC write performance at 90% or more | Perform recovery with maintaining SLC write performance at 95% or more | Not perform (Disable) |

F I G. 10

```
DynamicSLCBufferCredit;              //the total size of the reserved dynamic SLC buffer
IdleTime=GetIdleTime();              //to acquire the idle time by the timer
IF(IdleTime>=5){
    DynamicSLCBufferCredit=DynamicSLCBufferCredit+10GB;   //an additional 10GB of the dynamic SLC buffer is
                                                          reserved
}
```

F I G. 11

| Bytes | Field | Bits | Sub-field | Description | Value |
|---|---|---|---|---|---|
| [03:00] | Command Dword 0 (CDW0) | [31:16] | Command Identifier (CID) | "Command ID" | 0x01 |
| | | [15:14] | PRP or SGL for Data Transfer (PSDT) | "PRPs" | 00b |
| | | [13:10] | Reserved | Unused | 0000b |
| | | [09:08] | Fused Operation (FUSE) | "Normal Operation" | 00b |
| | | [07:00] | Opcode (OPC) | "Set Feature" | 09h |
| [07:04] | Namespace Identifier (NSID) | | | "Namespace ID" | 0x00000001 |
| [15:08] | Reserved | | | Unused | 0x0 |
| [23:16] | Metadata Pointer (MPTR) | | | Unused | 0x0 |
| [39:24] | Data Pointer (DPTR) | | | Unused | 0x0 |
| [43:40] | Command Dword 10 (CDW10) | [31] | Save (SV) | "Save" | 1b |
| | | [30:08] | Reserved | Unused | 0x000000 |
| | | [07:00] | Feature Identifier (FID) | "Vendor Specific" | C0h |
| [47:44] | Command Dword 11 (CDW11) | | | SLCbuffer packaged parameter set<br>0x0: Moderate<br>0x1: Aggressive<br>0x2: Passive<br>Others: reserved | 0x1 |
| [51:48] | Command Dword 12 (CDW12) | | | Unused | 0x0 |
| [55:52] | Command Dword 13 (CDW13) | | | Unused | 0x0 |
| [59:56] | Command Dword 14 (CDW14) | | | Unused | 0x0 |
| [63:60] | Command Dword 15 (CDW15) | | | Unused | 0x0 |

FIG. 12

| Category | Item |
|---|---|
| Write performance and power consumption | Amount of data written to static SLC buffer |
| | Amount of data written to dynamic SLC buffer |
| | Amount of date written by TLC write operation |
| | Amount of free blocks recovered from static SLC buffer |
| | Amount of free blocks recovered from dynamic SLC buffer |
| Reliability | Amount of data written by host write |
| | Amount of data written by NAND write (WAF) |
| Stability of write performance | Amount of data written by GC |

F I G. 14

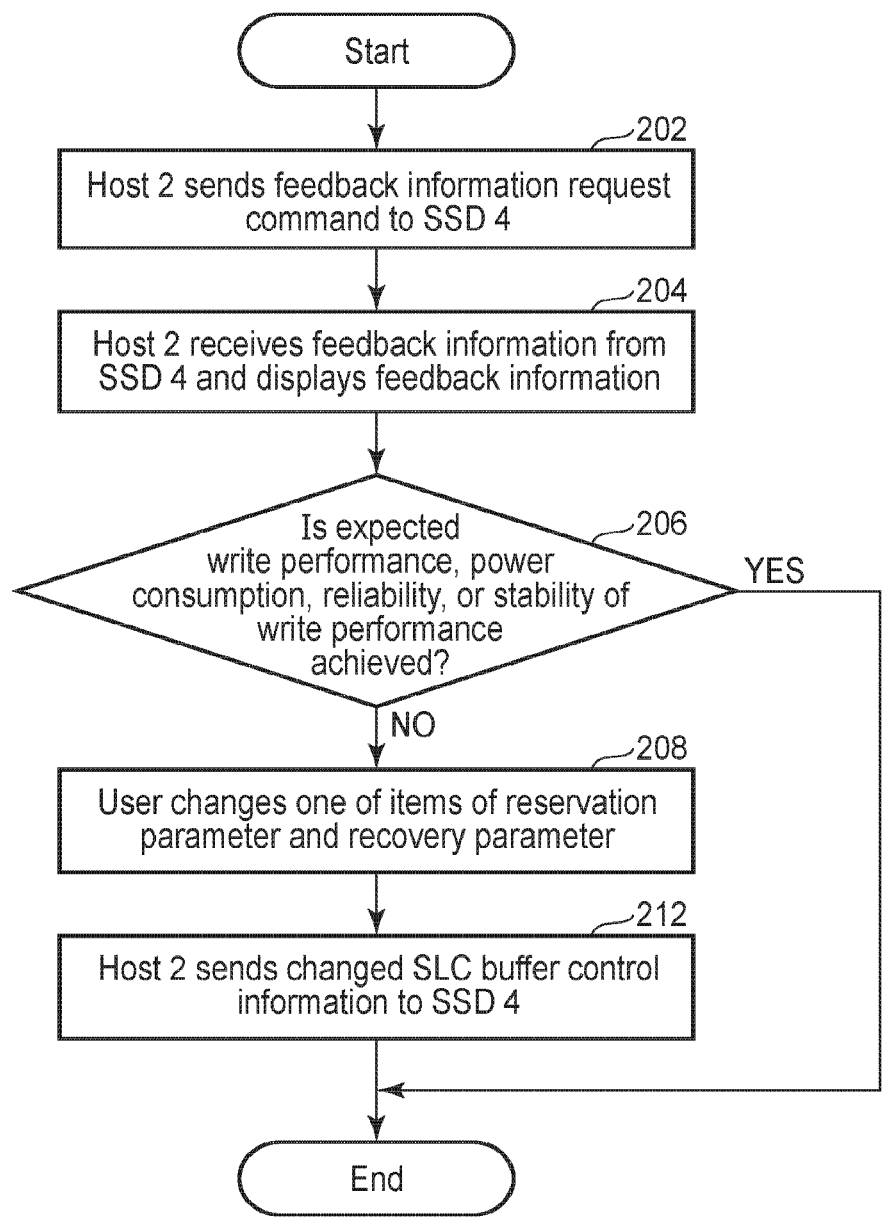
F I G. 15

STORAGE DEVICE, STORAGE SYSTEM, AND CONTROL METHOD

CROSS-REFERENCE TO RELATED APPLICATIONS

This application is based upon and claims the benefit of priority from Japanese Patent Application No. 2021-043650, filed Mar. 17, 2021, the entire contents of which are incorporated herein by reference.

FIELD

Embodiments described herein relate generally to a technique of controlling a nonvolatile memory.

BACKGROUND

In recent years, storage devices with a nonvolatile memory are widely used. As one type of such storage devices, a solid state drive (hereinafter referred to as SSD) has been known.

The SSD is used as a storage device of a personal computer. Furthermore, the SSD is used as a storage device of various host computing systems such as servers provided for a data center.

A novel technique for the SSD, which enables more efficient usage of a memory area included in the nonvolatile memory has been required.

BRIEF DESCRIPTION OF THE DRAWINGS

FIG. 1 is a block diagram illustrating an example of the structure of a storage system including a storage device of a first embodiment.

FIG. 3 illustrates an example of SLC buffer control information.

FIG. 4 is a diagram illustrating an example of a data flow by an SLC buffer controller at a first timing.

FIG. 5 is a diagram illustrating an example of a data flow by the SLC buffer controller at a second timing.

FIG. 8 is a diagram illustrating an example of a data flow by the SLC buffer controller at a fifth timing.

FIG. 9 is a diagram illustrating an example of a data flow by the SLC buffer controller at a sixth timing.

FIG. 10 is a diagram illustrating an example of SLC buffer control information packages.

FIG. 11 is a diagram illustrating an example of an SLC buffer control program.

FIG. 12 is a diagram illustrating an example of a Set Feature command setting the SLC buffer control information.

FIG. 13 is a flowchart of an example of a process of setting the SLC buffer control information when the SSD is powered on.

FIG. 14 is a diagram illustrating an example of feedback information sent from the SSD to the host.

FIG. 15 is a flowchart of an example of a process of adjusting the SLC buffer control information by the host based on the feedback information.

DETAILED DESCRIPTION

Figure 2A:
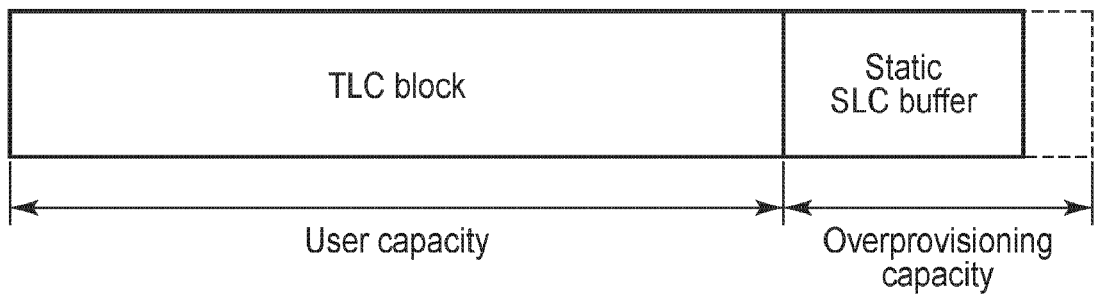
FIGS. 2A, 2B, and 2C illustrate a concept of an SLC (single-level cell) buffer.

Embodiments will be described hereinafter with reference to the accompanying drawings. The disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. In some drawings, some elements may be drawn with different proportions and ratios. In some drawings, same elements will be referred to by same reference numbers and explanation considered redundant will be omitted. Some elements may be referred to by different names and terms, which are simply examples, and such elements may further be referred to by other names and terms. Furthermore, elements which are referred to by a single name or term may be referred to by other names and terms. Furthermore, in the following description, a term "connection" means not only direct connection but also connection via other elements.

In general, according to one embodiment, a storage device comprises a nonvolatile memory including a plurality of blocks, and a controller configured to perform a first data write operation in a first mode for a block of a first block group, and to perform a second data write operation in a second mode for a block of a second block group. Data of a first number of bits is written per memory cell in the first mode. Data of a second number of bits is written per memory cell in the second mode. The second number is larger than the first number. The controller is configured to reserve one or more free blocks in the plurality of blocks as write destination block candidates of the first data write operation, perform the first data write operation for one of the write destination block candidates, and perform a garbage collection operation based on first control information received from an external device for an active block or blocks in which data has been written by the first data write operation.

First Embodiment

An example of the structure of a storage system including a storage device of a first embodiment will be explained. FIG. 1 is a block diagram illustrating an example of the structure of the storage system including the storage device of the first embodiment. The storage device is a semiconductor storage device configured to write data to a nonvolatile memory and read data from the nonvolatile memory. For example, the nonvolatile memory is, a NAND flash memory, a NOR flash memory, a Magnetoresistive Random Access Memory (MRAM), a Phase change Random Access Memory (PRAM), a Resistive Random Access Memory (ReRAM), or a Ferroelectric Random Access Memory (FeRAM). In the present application, the nonvolatile memory is, for example, a NAND flash memory (hereinafter referred to as NAND memory).

The storage system includes a host 2 and an SSD 4. The host 2 is an information processing device which is an external device of the SSD and is capable of access to the SSD 4. The host 2 may be a server (storage server) configured to write bulk data (or massive data) and other various data into the SSD 4, or may be a personal computer or a mobile terminal, for example.

The SSD 4 may be used as a main storage of the host 2. The SSD 4 may be embedded in the host 2, or may be provided outside the host 2 and connected to the host 2 via a cable wire or a wireless network.

An interface used for connection between the host 2 and the SSD 4 may be, for example, a SCSI, Serial Attached SCSI (SAS), an ATA, a Serial ATA (SATA), a PCI Express (PCIe)™, an Ethernet™, a Fibre channel, an NVMe™, and the like.

The SSD 4 includes a NAND memory 12 and a controller 14 thereof. The controller 14 may be realized by a circuit such as a System-on-a-Chip (SoC). The SSD 4 may include a random access memory which is a volatile memory, for example, a dynamic random access memory (DRAM) 16. Instead of the DRAM 16, a static random access memory (SRAM) 26 may be provided in the controller 14, or in addition to the DRAM 16, the SRAM 26 may be provided in the controller 14.

The NAND memory 12 may include a plurality of NAND memory chips (may be referred to as NAND memory dies). Each NAND memory chip may be realized as a NAND memory configured to store data of one or more bits per memory cell.

The NAND memory 12 includes a plurality of memory cells arranged in a matrix. The NAND memory 12 may be a two-dimensional structure memory or a three-dimensional structure memory.

The memory cell array of the NAND memory 12 includes a plurality of blocks BLK0 to BLKx-1, x representing a natural number more than two. Each of the blocks BLK0 to BLKx-1 includes a plurality of pages P0 to Py-1, y representing a natural number more than two. Each of the pages P0 to Py-1 contains a plurality of memory cells connected to the same word line. Each of the blocks BLK0 to BLKx-1 is a unit of erase operation that erases data from the NAND memory 12. A block may also be referred to as an erase block, a physical block, or a physical erase block. A page is a unit of write operation (or program operation) and read operation. A word line may be used as a unit for write and read operations.

The allowable maximum number of write/erase (W/E) cycles for each of the blocks BLK0 to BLKx-1 is limited. A W/E cycle for a certain block includes an erase operation to erase memory cells included in this block simultaneously and a write operation to write data to the pages in this block.

A NAND memory configured to store one bit of data per memory cell referred to as a single-level cell (SLC) NAND memory, configured to store multiple bits of data per memory cell referred to as a multi-level cell (MLC, or 4LC), configured to store two bits of data per memory cell referred to as a triple-level cell (TLC, or 8LC), and configured to store three bits of data per memory cell referred to as a quad-level cell (QLC, or 16LC) may be used in the present embodiment. Moreover, a NAND memory configured to store four bits of data and five or more bits of data per memory cell may also be used in the present embodiment. Here, a NAND memory which can store two or more bits of data per memory cell is sometimes referred to as an MLC memory, but in the following description, a NAND memory which can store two bits of data per memory cell is referred to as the MLC memory.

The NAND memory 12 can perform write operations in multiple write modes that differ in how many bits of data are written per memory cell. For example, a write mode in which one bit of data is written per memory cell (referred to as an SLC mode), a write mode in which two bits of data are written per memory cell (referred to as an MLC mode), a write mode in which three bits of data are written per memory cell (referred to as a TLC mode), a write mode in which four bits of data are written per memory cell (referred to as a QLC mode), and a write mode in which five or more bits of data are written per memory cell, etc., may possibly be applied.

The data density per memory cell in each write mode is two values in the SLC mode, four values in the MLC mode, eight values in the TLC mode, and 16 values in the QLC mode. The amount of data stored by a memory cell connected to the same word line is one page in the SLC mode, two pages in the MLC mode, three pages in the TLC mode, and four pages in the QLC mode. The data read and write speeds of the NAND memory 12 are slower for higher data densities and faster for lower data densities. Thus, among these four write modes, the data read and data write speeds in the QLC mode are the slowest, and the data read and data write speeds in the SLC mode is the fastest. The SLC mode is oriented to a write performance-prioritized write mode that can achieve high throughput. The write mode with a high data density per memory cell, such as the QLC mode, is oriented to a capacity-prioritized write mode.

If the storage capacity of the NAND memory 12 structured as the SLC memory is 128 GB, under optimal conditions without defective blocks, etc., and if with the same number of blocks, the storage capacity of the NAND memory 12 structured as the MLC memory is 256 GB, the storage capacity of the NAND memory 12 structured as the TLC memory is 384 GB, and the storage capacity of the NAND memory 12 structured as the QLC memory is 512 GB.

For example, when the NAND memory 12 is realized as the MLC memory, if there are no defective cells, two pages of data (lower page data and upper page data) are written into multiple memory cells connected to the same word line.

Data may be written to the MLC memory by the MLC mode and also by a write mode, that is, the SLC mode, which has a lower data density than the MLC mode. Therefore, any area (e.g., one or more arbitrary blocks) in the MLC memory can be used as an area that can store only one bit per memory cell (called an SLC area). The SLC area may be set in subunits smaller than one block (e.g., the subunits may be units of word lines, units of a set of word lines in one block).

In the MLC memory, when a write operation to write data to the SLC area is selected by the SLC mode, only one page of data (lower page data) is written to multiple memory cells connected to the same word line. This allows only one bit per memory cell to be written in the blocks in the MLC memory which are used as the SLC area, as same manner as in the blocks in the SLC memory (an SLC block).

The blocks used as the SLC area in the MLC memory function as pseudo SLC blocks. In the present embodiments, a block used only as the pseudo SLC block in the MLC memory is referred to as an SLC dedicated block; remaining blocks in the MLC memory which can be used as both the SLC block and an MLC block are referred to as SLC/MLC shared blocks. In addition to the SLC dedicated block and the SLC/MLC shared block, a MLC memory having an MLC dedicated block that can only be used as the MLC block may be provided.

Similarly, the blocks used as the SLC area in the TLC memory also function as pseudo SLC blocks. In the present embodiments, the block used only as the pseudo SLC block in the TLC memory is also referred to as the SLC dedicated block; remaining blocks in the TLC memory can be used either as the SLC block or as the TLC block and are referred to as SLC/TLC shared blocks. In addition to the SLC dedicated block and the SLC/TLC shared block, the TLC memory having a TLC dedicated block that can only be used as a TLC block may be provided.

Similarly, the blocks used as the SLC area in the QLC memory also function as pseudo SLC blocks. In the present embodiments, the block used only as the pseudo SLC block in the QLC memory is also referred to the SLC dedicated block; remaining blocks in the QLC memory can be used either as the SLC block or as the QLC block and are referred to as SLC/QLC shared blocks. In addition to the SLC dedicated block and the SLC/QLC shared block, the QLC memory having a QLC dedicated block may be provided.

If NAND memory 12 is realized as the TLC memory, assuming there are no defective cells, three pages of data (lower page data, middle page data, and upper page data) are written into multiple memory cells connected to the same word line.

Data may be written to the TLC memory in the TLC mode and also in a write mode, that is, the SLC mode or the MLC mode, which has lower data density. Thus, any area in the TLC memory (for example, one or more arbitrary blocks) can be used as the SLC area. The TLC memory may have the SLC dedicated block and the SLC/TLC shared block that can be used as both the SLC block and the TLC block, or may have an additional TLC-specific block.

When the NAND memory 12 is realized as the QLC memory, assuming there are no defective cells, four pages of data are written into multiple memory cells connected to the same word line.

Data can be written to the QLC memory by the QLC mode and also by write modes with lower data density, that is, the SLC mode, the MLC mode, or the TLC mode. Thus, any area in the QLC memory (for example, one or more arbitrary blocks) can be used as the SLC area. The QLC memory may have the SLC dedicated block and the SLC/QLC shared block, or may have an additional QLC dedicated block.

Even when the NAND memory 12 is configured to store more than 5 bits per memory cell, any area in the NAND memory 12 can be used as the SLC area.

The controller 14 functions as a memory controller configured to control the NAND memory 12.

The controller 14 includes a host interface (I/F) circuit 22, a direct memory access controller (DMAC) 24, a static RAM (SRAM) 26 as a volatile memory, an ECC encoder/decoder 28, a CPU 30, a DRAM interface (I/F) circuit 32, a NAND memory interface (I/F) circuit 34. As shown, those elements 22, 24, 26, 28, 30, 32, and 34 are interconnected via a bus 36.

The controller 14 is electrically connected to the NAND memory 12 via the NAND memory I/F circuit 34.

The NAND memory I/F circuit 34 conforms to, but is not limited to, a Toggle NAND flash interface, or an Open NAND flash interface (ONFI), etc. The NAND memory I/F circuit 34 is connected to a plurality of NAND memory chips included in the NAND memory 12 via a plurality of channels (Chs) corresponding to the NAND memory chips, respectively. By driving multiple NAND memory chips in parallel, an access bandwidth of the NAND memory 12 can be increased.

The controller 14 may function as a flash translation layer (FTL) configured to perform data management and block management of the NAND memory 12.

The data management performed by the FTL includes, for example, (1) management of mapping information that shows the correspondence between each logical address and each physical address of the NAND memory 12, and (2) processing to hide page read operation, page write operation, and block erase operation.

The logical address is an address used by the host 2 to indicate the location of the data to be read and written in SSD 4. An example of a logical address is a logical block address (LBA). The physical address is an address used by the controller 14 to indicate the location of the data to be read and written in the NAND memory 12. The block number is one of the elements that form the physical address. The determination of a physical address corresponding to a logical address from the logical address is called address translation or address conversion.

The controller 14 manages the mapping between each of the LBAs and each of the physical addresses in predetermined management size units using a look-up table (LUT) that serves as a logical-to-physical address translation table (or L2P table). The physical address corresponding to a given LBA indicates a physical storage location in the NAND memory 12 to which the data for this LBA is written. An L2P table 54 may be loaded from the NAND memory 12 into the DRAM 16 when the SSD 4 is powered on.

The data write to a page can be done only once per W/E cycle. For this reason, the controller 14 writes updated data corresponding to a certain LBA to another physical storage location, instead of the physical storage location where previous data corresponding to the certain LBA is stored. Then, the controller 14 updates the L2P table 54 to associate the LBA with the other physical storage location, and invalidates the previous data corresponding to the certain LBA.

Invalidated data (or sometimes just called "invalid data") means data stored in a physical storage location that is not referred from the L2P table 54. For example, data stored in a physical storage location that is not referred from the L2P table 54 (that is, data that is not associated with the LBA as the latest data) is invalid data. Invalid data is data that is no longer likely to be read from the host 2. When the updated data is stored in the logical area associated with an LBA, the valid data previously stored in that logical area becomes invalid data, and the updated data becomes valid data.

Valid data means the latest data corresponding to a certain LBA. For example, the data stored in the physical storage location referred from the L2P table 54 (that is, the data associated with the LBA as the latest data) is valid data. Valid data is data that may be read from the host 2 later.

The block management performed by the FTL includes a defective block management, a wear leveling, and a garbage collection (GC).

The wear leveling is an operation to modify the Host write operation or the GC operation so as to equalize the number of rewrites (the number of W/E cycles) for each block.

The GC operation reduces the number of active blocks in which valid data and invalid data are mixed, and increases the number of the free blocks. A free block is a block that contains only invalid data, not valid data. A free block is a block that can be used as a destination block for writing new data after the erase operation has been performed.

The host I/F circuit 22 is configured to perform communication with the host 2. For example, a SATA™ interface controller, SAS™ interface controller, PCIe™ controller, or Ethernet™ controller is used for the host I/F circuit 22.

The host I/F circuit 22 receives various commands from the host 2. ATA™ commands defined by the ATA standard are used for the SATA interface, SCSI™ commands defined by the SCSI standard are used for the SAS interface, and NVMe commands defined by NVMe standard are used for the PCIe interface and Ethernet interface. The commands received from the host 2 include a write command, a read command, and an SLC buffer control information request command. An SLC buffer and the SLC buffer control information will be described later.

The write command requests the SSD 4 to write user data (write data) to the NAND memory 12. The read command requests the SSD 4 to read data designated by the read command. The SLC buffer control information request command requests the SSD 4 to send the SLC buffer control information.

The DMAC 24 performs data transfer between a write buffer of the host 2 and a write buffer 52 in the DRAM 16 under the control of the CPU 30. When the write data should be transferred from the write buffer of the host 2 to the write buffer 52, the CPU 30 designates to the DMAC 24 the source address indicating the location in the write buffer of the host 2, the size of the write data to be transferred, and the destination address indicating the location in the write buffer 52.

The ECC encoder/decoder 28 can be implemented as a circuit with functions for protecting data written to the NAND memory 12 and data read from the NAND memory 12 with an error correcting code (ECC). For example, when encoding data, the ECC encoder/decoder 28 adds the ECC to the data written to the NAND memory 12. When decoding data, the ECC encoder/decoder 28, with use of the ECC added to the data read from the NAND memory 12, determines whether or not an error has occurred in the data. If an error has occurred, the ECC encoder/decoder 28 corrects the error of the data.

The ECC encoder/decoder 28 may be provided in the NAND memory I/F circuit 34.

The CPU 30 is a processor configured to control the host I/F circuit 22, the NAND memory I/F circuit 34, and the DRAM I/F circuit 32. When the SSD 4 is powered on, the CPU 30 loads a control program (or firmware) stored in the NAND memory 12 or ROM (not shown) into the DRAM 16, and performs the control program to perform various command processing, etc. The operation of the CPU 30 is controlled by such the control program. Some or all of the command processing may be performed by a specific hardware in the controller 14.

The CPU 30 includes functions as an SLC buffer controller 42, a write controller 44, and a GC controller 46. The SLC buffer controller 42 controls the size of the SLC buffer using the write controller 44 and the GC controller 46.

The DRAM 16 includes the write buffer 52, which is a buffer area for temporarily storing data to be written to the NAND memory 12, a GC buffer 56 for temporarily storing data read from the GC source block during an GC operation (i.e. garbage collection operation), and the L2P table 54. The DRAM 16 may be in the controller 14. At least one of the write buffer 52, the GC buffer 56, or the L2P table 54 may be in the SRAM 26.

Now, the host write operation of the SSD 4 will be explained. Here, for example, the NAND memory 12 realized as the TLC memory is explained. However, the same explanation will be applicable to a case where the NAND memory 12 realized as the MLC memory and the QLC memory, etc.

Since the NAND memory 12 includes two types of blocks, for example, the SLC dedicated block and the SLC/TLC shared block, the controller 14 can write data received from the host 2 to the NAND memory 12 in the SLC mode or the TLC mode (host write). However, if the host write is performed in the TLC mode, which has a slow write speed, the throughput, or write performance, will decrease. For this reason, it is considered that the controller 14 should write the data received from the host 2 to the NAND memory 12 in a write mode, which stores fewer bits of data per memory cell than the TLC mode, that is, for example, the SLC mode.

In such a write method, the controller 14 writes the write data received from the host 2 to the write buffer 52. The controller 14 reads the write data from the write buffer 52 and writes the write data to a write destination block of the NAND memory 12. The controller 14 can select the SLC mode or the TLC mode as the write mode of the write data to the destination block.

The write controller 44 reserves one or more free blocks of the NAND memory 12 as write destination block candidates for a data write operation in the SLC mode. The write controller 44 performs a data write operation in the SLC mode to one of the write destination block candidates. The destination block to which data is written in the SLC mode becomes an active block. A reserved area including free blocks reserved as the write destination block candidates and an active area including active blocks to which data has been written in the SLC mode are collectively referred to as an SLC buffer. The SLC buffer is not a physical name of the block but a functional name indicative of a function of the block. The write controller 44 may reserve both the SLC dedicated block and the SLC/TLC shared block as the write destination block candidates of the data write operation in the SLC mode. Therefore, the write controller 44 can reserve only the SLC dedicated block as the write destination block candidates, only the SLC/TLC shared block as the write destination block candidates, or both the SLC dedicated block and the SLC/TLC shared block as the write destination block candidates. The free block reserved as the write destination block candidates can only be used as a write destination block in the SLC mode for write data, and is not allowed to be used for any other purpose.

The SLC buffer is classified into a static SLC buffer and a dynamic SLC buffer.

Figure 2B:
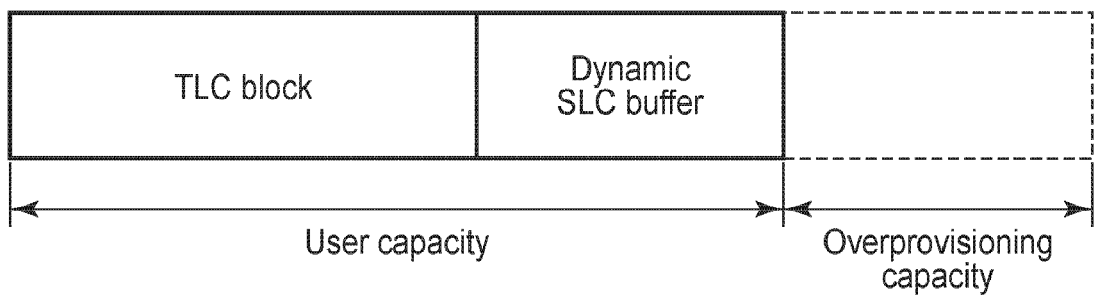

FIG. 2A illustrates a concept of a static SLC buffer system. FIG. 2B illustrates a concept of a dynamic SLC buffer system. FIG. 2A and FIG. 2B illustrate examples of a memory space of the NAND memory 12 when the GC operation is fully performed. FIG. 2A illustrates a case where the user data utilization rate is 100%. FIG. 2B illustrates a case where the user data utilization rate is less than 100%.

As shown in FIG. 2A, the physical storage capacity of the SSD 4 can be divided into the user capacity available to the user and the overprovisioning capacity. The overprovisioning capacity corresponds to a partial area in the user data storage area of the SSD 4 which cannot be accessed by the user. The SLC dedicated free block and the SLC/TLC shared free block that are reserved in a certain amount of the overprovisioning capacity of the NAND memory 12 can be used as the static SLC buffer. Therefore, in the static SLC buffer system, the SLC buffer is available regardless of the user data utilization rate, and the write controller 44 can write data to the destination block by the SLC mode. The definition of the user data utilization rate is (total size of LBAs in which valid data is written)/(user capacity).

As shown in FIG. 2B, the SLC/TLC shared free block within the user capacity of the NAND memory 12 can be used as the dynamic SLC buffer. If the user data utilization rate is high, there are no more free blocks available as the dynamic SLC buffers, and the SLC buffer may become unavailable. Therefore, in the dynamic SLC buffer system, the write controller 44 can write data to the write destination block by the SLC mode only if the user data utilization rate is low. If the user data utilization rate is high, the write controller 44 writes the write data to the write destination block allocated from free blocks other than the SLC buffer of the NAND memory 12 by the TLC mode.

Figure 2C:
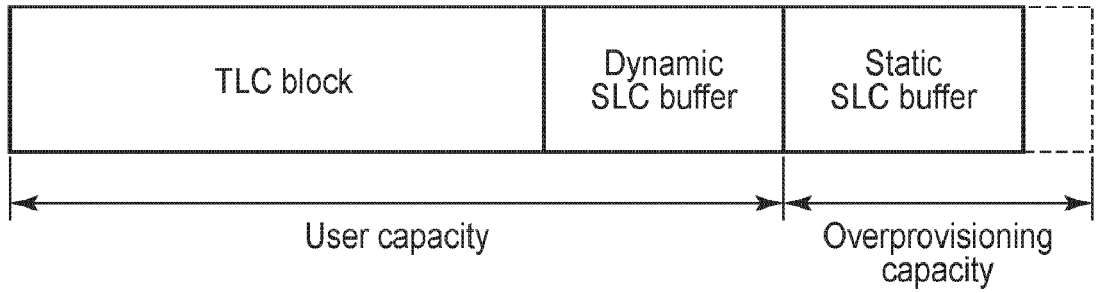

FIG. 2C illustrates a concept of a hybrid SLC buffer system, which uses both the static and dynamic SLC buffer systems. FIG. 2C also illustrates an example of a memory space of the NAND memory 12 if the GC operation is fully performed. FIG. 2C illustrates a case where the user data utilization rate is less than 100%. In the present embodiment, the hybrid SLC buffer method is used to perform the host write.

When the write controller 44 selects the SLC mode as the write mode for write data to the write destination block, the write controller 44 allocates one of the free blocks in the reserved area of the SLC buffer as the write destination block. Allocating a free block to the write destination block includes selecting one of the free blocks in the reserved area of the SLC buffer as the write destination block, performing an erase operation on the selected free block so as to be available for writing new data, and setting the block as the write destination address for the next host write.

After the allocation of the free block, the write controller 44 writes the write data to the write destination block in the SLC mode. As a result of this write, the size of the reserved area of the SLC buffer is decreased and the size of the active area is increased.

After the data write to the write destination block in the SLC mode, the write controller 44 is able to read such data from the write destination block at an arbitrary timing and write the read data to a free block other than the SLC buffer in the TLC mode.

The GC controller 46 can set at least one of the SLC active blocks as a free block by performing the GC operation on the SLC active blocks. For example, the GC controller 46 sets one of the SLC active blocks as a copy source block and one of the free blocks as a copy destination block. The GC controller 46 may set a block with fewer valid data in the SLC active blocks in which valid and invalid data are mixed as the copy source block. The GC controller 46 copies the valid data in the copy source block to the copy destination block. The GC controller 46 may update the L2P table 54 to map the physical address of the copy destination block to each LBA of the valid data of the copy source block copied to the copy destination block. The copy-source block that contains only invalid data due to the copy of the valid data to the copy-destination block becomes a free block. The amount of valid data copied from the source block to the destination block is referred to as "amount of GC write". The free block reserved as the write destination block candidates in the SLC mode is allowed to be used only as the write destination block in the SLC mode and not for any other purpose. The free block generated from the GC operation can be used for other purposes than the write destination block in the SLC mode. The GC operation may be referred to as recovery of the SLC buffer. The number of the free blocks that can be reserved as the write destination block candidates in the SLC mode is increased by the recovery. As a result, the size of the reserved area of the SLC buffer can be increased.

Although an example in which the SLC active block is selected as the copy source block for the GC operation has been described, the copy source block is not limited thereto. It is possible to select the TLC active block as the copy source block. Therefore, the amount of GC write includes the amount of valid data copied from the TLC active block to the TLC free block by the GC operation.

When the write controller 44 selects the TLC mode as the write mode for write data, the write controller 44 writes the write data read from the write buffer 52 to the write destination block selected from the free blocks other than the reserved area of the SLC buffer by the TLC mode. The block to which the data is written in the TLC mode is referred to as the TLC active block.

While the GC controller 46 performs the GC operation, the write controller 44 may execute the write operation in the TLC mode.

As mentioned above, the write speed in the SLC mode is faster than the write speed in the TLC mode. Therefore, if high write performance is required, an SLC buffer usage period, which is the period during which high write performance is sustained by using the SLC buffer during successive host writes, may be lengthened. Therefore, the ratio of the period during which the write data is written to the destination block in the SLC mode to the total write period is increased. Alternatively, if high write performance is required, an SLC buffer usage frequency, which is a frequency at which high write performance is achieved by using the SLC buffer during an intermittent host write, may be increased. The intermittent host write is a period when the host writes are performed intermittently with idle periods in between. The SLC buffer usage period and the frequency of the SLC buffer usage are related to the size of the reserved area of the SLC buffer. If the size of the reserved area of the SLC buffer is small, it may not be possible to lengthen the SLC buffer usage period or increase the SLC buffer usage frequency.

A larger size of the reserved area of the SLC buffer will allow for a longer SLC write period and/or a higher SLC write frequency. The size of the reserved area of the SLC buffer is decreased as data from the host 12 is written. The size of the reserved area of the SLC buffer can be increased when the number of the free blocks is increased by the GC operation and the number of blocks that can be reserved as the write destination block candidates by the SLC mode is increased.

Therefore, increasing the number of blocks in the reserved area of the SLC buffer, increasing a GC execution frequency, and increasing the number of the free blocks that can be reserved as the write destination block candidates in the SLC mode may enable the SSD 4 to achieve high write performance. The size of the reserved area of the SLC buffer can be increased by the write controller 44, and the number of the free blocks that can be reserved as the write destination block candidates in the SLC mode can be increased by the GC controller 46.

However, if the SLC buffer is used longer and/or more frequently, the write amplification factor (WAF), which is an indicator of how many times an amount of data is written to the NAND memory 12 more than an amount of data supplied from the host 2, may deteriorates, power consumption may increase, and a write performance may become unstable. Thus, reliability may be decreased. Users who require the high write performance of the SSD 4 will not enjoy high performance stability, high reliability, and low power.

Conversely, users who require high performance stability, high reliability, and low power will not enjoy high write performance of the SSD 4. Thus, because different users require different things for the SSD 4, the operation of the write controller 44 to increase the size of the reserved area of the SLC buffer, the operation of the GC controller 46 to increase the number of the free blocks that can be reserved as the write destination block candidates in the SLC mode, and the operation of the write controller 44 to reserve free blocks as the write destination block candidates by SLC mode should be mode controlled per user.

The SLC buffer controller 42 provides an interface to the host 2 for setting SLC buffer control information including a number of items that control the SLC buffer usage period and/or the SLC buffer usage frequency. The host 2 can send the SLC buffer control information set by the user to the SSD 4 according to the performance considered important. The SSD 4 receives the SLC buffer control information from the host 2 through this interface.

Note that, in the SSD 2, default SLC buffer control information is stored in the NAND memory 12 and the like. The write performance or the reliability is considered more important in the default SLC control information. If the SLC buffer controller 42 does not receive the SLC buffer control information from the host 2, the SLC buffer controller 42 controls the reservation and recovery of the SLC buffer based on the default SLC buffer control information.

When the SLC buffer controller 42 receives the SLC buffer control information from the host 2, the SLC buffer controller 42 controls the reservation and recovery of the SLC buffer based on the SLC buffer control information received from host 2 instead of the default SLC buffer control information. Thus, the SLC buffer controller 42 controls the reservation and recovery of the SLC buffer according to the performance required of the SSD 4 by each user.

FIG. 3 illustrate an example of the SLC buffer control information, which includes SLC buffer reservation parameter and SLC buffer recovery parameter. There are two items of reservation parameter and six items of recovery parameter. The SLC buffer reservation parameter indicates how the SLC buffer controller 42 reserves the SLC buffer. The SLC buffer recovery parameter indicates how the SLC buffer controller 42 recovers the SLC buffer by the GC operation.

A first item of the reservation parameter indicates the maximum size of the SLC buffer which is the total of the size of the reserved area of the SLC buffer and the size of the active area of the SLC buffer. That is, the first item of the reservation parameter notifies a total size of the free blocks to be reserved as the write destination block candidates in the SLC mode to the write controller 44 such that a sum of the reserved area of the SLC buffer and the active area of the SLC buffer does not exceed the maximum size X (GiB) specified in this item.

A second item of the reservation parameter indicates the SLC buffer reservation size which is the total size of the free blocks that can be reserved as the write destination block candidates in the SLC mode at the timing of the SLC buffer reservation. The timing of the SLC buffer reservation is predetermined. Since the total size of the free blocks changes from time to time, the reservation size of the SLC buffer is defined according to the total size of the free blocks. For example, if the total size of the free blocks is X (GiB) or more, the reservation size is Y (GiB). Or, if the total size of the free blocks is X (GiB) or less than X (GiB), the reservation size is Y (GiB). That is, the second item of the reservation parameter instructs the write controller 44 to reserve a free block of the total size specified in this item as the write destination block candidates in the SLC mode.

The recovery parameter indicates whether the recovery of the free block is to be performed or not in the various operation states of the SSD 4, and indicates the specific manner in which the recovery is to be performed.

A first item of the recovery parameter indicates a recovery method in an active idle period of the SSD 4. The SSD 4 is set to the active idle state after a certain period of time has passed in which the SSD 4 does not receive commands from the host 2. An example setting of the first item is to perform the recovery (enable) or not to perform the recovery (disable).

A second item of the recovery parameter indicates a recovery method in a standby entry period of the SSD 4. The SSD 4 is set to the standby state is a state while the SSD 4 is powered off. In the standby entry period, a power state of the SSD 4 is transited from a power on state to a shutdown state. An example setting of the second item is to perform the recovery until the size of the active area of the SLC buffer becomes zero, to perform the recovery until the total size of the free blocks becomes X (GiB) or more, or not to perform the recovery (disable).

A third item of the recovery parameter indicates a recovery method in a low power mode (LPM, or power saving operation mode) entry period. The SSD 4 can operate in the LPM in addition to a normal power mode. For example, NVMe standard defines three power saving operation modes as the LPM: PS3, PS4, and PS5. When the SSD 4 receives an LPM transition request from the host 2, the operation mode of the SSD 4 is switched from the normal power mode to the LPM. The LPM entry period is the period between when the SSD 4 receives the LPM transition request from the host 2 and when the SSD 4 sends a transition completion response to the host 2.

An example setting of the third item is to perform the recovery until the size of the active area of the SLC buffer becomes zero, to perform the recovery until the total size of the free blocks becomes X (GiB) or more, to perform the recovery for X (seconds) after the LPM transition completion response, to perform the recovery with maintaining a power consumption becomes less than X (mW) after the LPM transition completion response, or not to perform the recovery (disable). By measuring the power consumption of the SSD 4 during a design of the SSD 4, the write performance that results in the power consumption less than X (mW) can be determined. Therefore, by controlling the write performance, the recovery can be performed with maintaining the power consumption less than X (mW).

A fourth item of the recovery parameter indicates a recovery method in the LPM period. In the LPM period, a part of the controller 14 is powered on. An example setting of the fourth parameter is to perform the recovery while the power is supplied to the whole part of the SSD 4 every X seconds, to perform the recovery with maintaining the average power less than X (mW), or not to perform the recovery (disable). By measuring the power consumption of the SSD 4 during the design of the SSD 4, the write performance that results in the power consumption less than X (mW) can be determined. Therefore, by controlling the write performance, the recovery can be performed with maintaining the power consumption less than X (mW). In the LPM period, at least one of the NAND memory 12, a part of the controller 14, and the DRAM 16 is powered off. The controller 14 makes a power source supply power to the NAND memory 12, a remaining part of the controller 14, and the DRAM 16 to perform the GC operation. After the GC operation, the controller 14 powers off these components. The completion of the GC operation can be determined, for example, by completing a certain amount of GC write.

A fifth item of the recovery parameter indicates a recovery method in a TLC write operation. An example setting of the fifth parameter is to perform the recovery with maintaining a TLC write performance at X (%) or more, or not to perform the recovery (disable). By measuring the TLC write performance of the SSD 4 during the design of the SSD 4, the write performance that maintains the TLC write performance at X (%) or more can be determined. Thus, by controlling the write performance, the recovery can be performed with maintaining the TLC write performance at X (%) or more. There are various criteria for the TLC write performance of 100%. For example, the default TLC write performance may be set to 100%, or the TLC write performance if no GC operation is performed may be set to 100%. Furthermore, the TLC write performance may be set to 100% if the SLC buffer is not recovered.

As mentioned above, the GC operation may be performed while a write operation is performed by the TLC mode. In this case, a portion of the bandwidth of the NAND memory 12 is used for the GC operation, which may degrade the TLC write performance. The write characteristics in the fifth item mean the write performance including the amount of degradation.

The sixth item of the recovery parameter indicates a recovery method during an SLC write operation. An example setting of the sixth parameter is to perform the recovery within the range in which an SLC write performance maintains at X (%) or more or not to perform the recovery (disable). By measuring the SLC write performance of the SSD 4 during the design of the SSD 4, the write performance with maintaining the SLC write performance at X (%) or more can be determined. Thus, by controlling the write performance, the recovery can be performed with maintaining the SLC write performance at X (%) or more. There are various criteria for the SLC write performance of 100%. For example, the default SLC write performance may be set to 100%, or the SLC write performance if no GC operation is performed may be set to 100%. Furthermore, the SLC write performance may be set to 100% if the SLC buffer is not recovered.

A user sets a number of items of the SLC buffer control information based on the performance considered important using an input unit (not shown) of the host 2. For example, if write performance is important, the user sets the items of the SLC buffer control information so that the reservation size is increased and/or the recovery period is lengthened. For example, if reliability is important, the user sets the SLC buffer control information items so that the reservation size is decreased and/or the recovery period is shortened.

The host 2 includes a display unit (not shown) that displays the SLC buffer control information which is set by the user. The SLC buffer control information set by the user is verified by other devices to ensure that the SSD 4 operates correctly according to the SLC buffer control information. If the correct operation cannot be verified, the user changes the settings. The SLC buffer control information set by the user is stored in a memory (not shown) of the host 2.

When the SSD 4 is connected to the host 2, the host 2 transmits the SLC buffer control information to the SSD 4. The SLC buffer controller 42 that receives the SLC buffer control information controls the reservation and recovery of the SLC buffer based on the SLC buffer control information transmitted from the host 2 instead of the default SLC buffer control information.

FIGS. 4 to 9 illustrate examples of data flow when the SLC buffer controller 42 reserves and recovers the SLC buffer based on the SLC buffer control information at first to sixth timings. As shown in FIGS. 4 to 9, the blocks of the NAND memory 12 are classified into a free block area 62, an active area 64 of the SLC buffer, and a TLC active block area 66. The free block area 62 includes the free block of the SLC dedicated block and the free block of the TLC/SLC shared block. Write data to the SLC dedicated block is written only in the SLC mode, and write data to the TLC/SLC shared block is written in the SLC mode or TLC mode.

In the embodiment, the SLC buffer controller 42 performs SLC buffer reservation and SLC buffer recovery based on the SLC buffer control information set by the host 2. The SLC buffer usage period and/or the SLC buffer usage frequency are controlled based on whether write performance or reliability is considered important. The important write performance or reliability is improved. An added value of the SSD 4 is increased.

As shown in FIG. 4, when the SLC buffer control information from the host 2 is set to the SLC buffer controller 42 of the controller 14, the SLC buffer controller 42 transmits the SLC buffer reservation parameter in the SLC buffer control information to the write controller 44, and the SLC buffer recovery parameter in the SLC buffer control information to the GC controller 46.

The controller 14 determines whether or not the SLC buffer reservation timing has arrived. For example, the controller 14 determines that the SLC buffer reservation timing has arrived when the active idle period has passed 5 seconds.

When the controller 14 detects the arrival of the SLC buffer reservation timing, the write controller 44 reserves at least one free block in the free block area 62 as the write destination block candidates in the SLC mode, as shown in FIG. 5, and a reserved area 68 of the SLC buffer is generated. The total size of the free blocks reserved by the write controller 44 depends on the reservation parameter. The reserved area 68 still belongs to the free block area 62.

Figure 6:
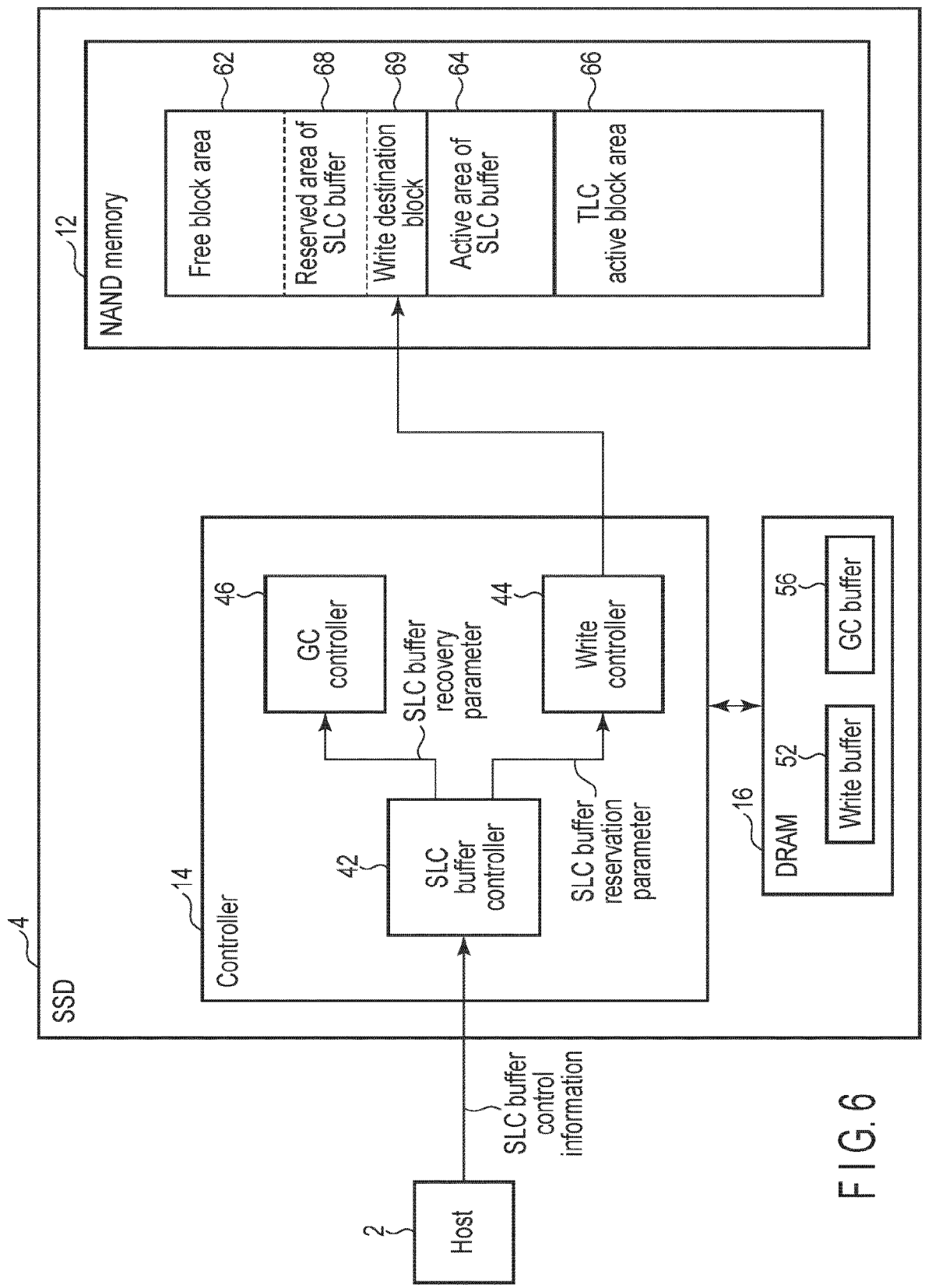
FIG. 6 is a diagram illustrating an example of a data flow by the SLC buffer controller at a third timing.

Then, the write controller 44 designates one free block in the reserved area 68 of the SLC buffer as a write destination block 69, as shown in FIG. 6. The write controller 44 performs an erase operation on the free block designated as the write destination block 69 to make the block 69 available for writing new data, and specifies the address of the block 69 as the address of the write destination for the next host write.

Figure 7:
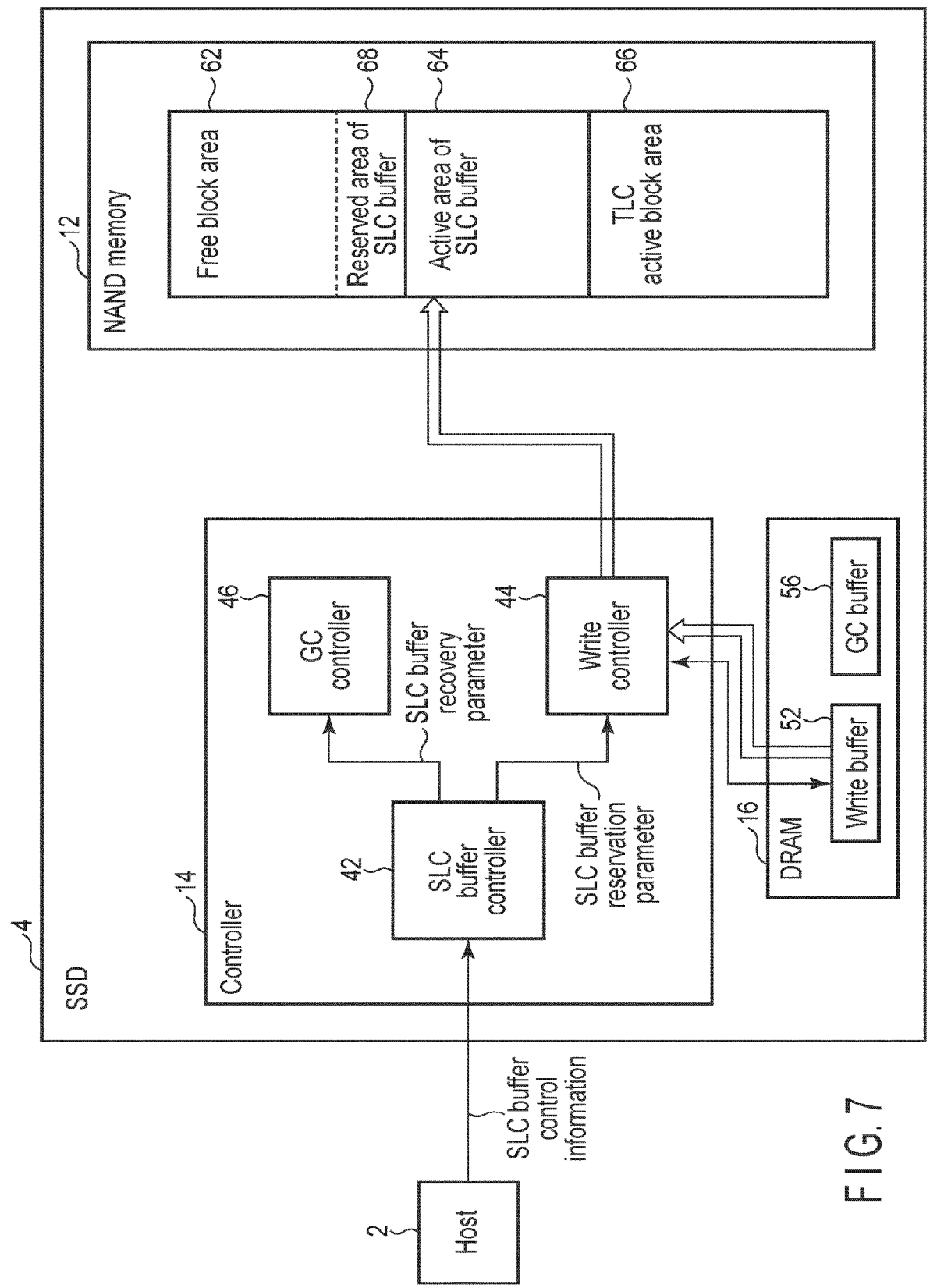
FIG. 7 is a diagram illustrating an example of a data flow by the SLC buffer controller at a fourth timing.

Thereafter, the write controller 44 reads the write data from the write buffer 52, and writes the write data to the write destination block 69 in the SLC mode as shown in FIG. 7. When the write data is written, the write destination block 69 becomes a block belonging to the active area 64 of the SLC buffer. As a result, the total size of the free block area 62 is decreased and the total size of the active area 64 of the SLC buffer is increased.

FIG. 8 illustrates a state transition of the block of the NAND memory 12 during the SLC buffer recovery. The GC controller 46 performs the GC operation according to the recovery parameter during the active idle period, the standby entry period, the LPM entry period, the LPM operation, the TLC write operation, or the SLC write operation.

The GC controller 46 designates a block in the active area 64 of the SLC buffer where the invalid data and valid data are stored as a GC source block 72, and designates a block in the free block area 62 as a GC destination block 74. The GC controller 46 reads the valid data from the GC source block 72 and stores the read valid data in the GC buffer 56. The GC controller 46 reads the valid data from the GC buffer 56 and stores the read valid data in the GC destination block 74.

The GC controller 46 updates the L2P table 54, and maps the physical address of the GC destination block 74 to each of the LBAs of the valid data of the GC source block 72. Thus, the valid data of the GC source block 72 is copied to the GC destination block 74.

By copying the valid data of the GC source block 72 to the GC destination block 74, the GC source block 72 will contain only invalid data. As shown in FIG. 9, the GC source block 72 becomes a free block 62A. The free block 62A may be reserved as the SLC buffer in future. As the GC source block 72 becomes the free block 62A, the total size of the free block area 62 (including the free block 62A) which has been decreased because of the data write operation in the SLC mode with respect to the SLC buffer allocated as the write destination block is increased. The GC destination block 74 becomes a TLC active block 66A.

Note that, although not shown in the figure, the GC controller 46 may perform the GC operation by designating a plurality of blocks in the TLC active block area 66 in which invalid and valid data are stored as the GC source blocks.

According to the first embodiment, the controller 14 can solve trade-off between write performance and reliability of the SSD 4 by controlling the SLC buffer usage period and/or the SLC buffer usage frequency according to the SLC buffer control information from the host 2.

Second Embodiment

As in FIG. 3, the SLC buffer control information contains a large number of items. When the number of items is increased, verification of the operations of the SSD 4 requires a longer time, and generating of the SLC buffer control information by setting each item by a user may become difficult. The second embodiment to easily generate the SLC buffer control information will be explained here. In the second embodiment, an SLC buffer control information packages are prepared, in which each item of the SLC buffer control information is set to meet typical requirements of users. SLC buffer control information packages may be stored in the host 2. The SLC control information packages may be prepared by a user, or may be prepared by a vendor of the host 2. When the SLC buffer control information packages are prepared, the operation of the SSD 4 is verified for each combination of settings. If the verification result is no good, the settings for any of the items are changed. In this manner, the operations of the SSD 4 in response to the combination of settings in the SLC buffer control information packages are verified, and thus, a user can start controlling the reservation and recovery of the SLC buffer by simply selecting one of these packages.

FIG. 10 illustrates an example of the SLC buffer control information packages according to three requirements of a user. FIG. 10 illustrates an example of aggressive setting package which improves the write performance by using more SLC buffer, an example of passive setting package in which improves the reliability by using less SLC buffer, and an example of moderate setting package which is between these two packages.

In the aggressive setting package, the maximum size of the SLC buffer is set to 80 GiB, and the reservation size of the SLC buffer is set to 80 GiB if the total size of the free blocks is 128 GiB or more, or to 80 GiB if the total size of the free blocks is less than 128 GiB. The item for the recovery in the active idle state is set to "perform the recovery (enable)", the item for the recovery in the standby entry period is set to "perform the recovery until the size of the active area of the SLC buffer becomes zero", the item for the recovery in the LPM entry period is set to "perform the recovery until the size of the active area of the SLC buffer becomes zero", and the item for the recovery in the LPM period is set to "not to perform (disable)". The item for the recovery in the TLC write operation is set to "perform the recovery with maintaining the TLC write performance at 80% or more", and the item for the recovery in the SLC write operation is set to "perform the recovery with maintaining the SLC write performance at 90% or more".

In the moderate setting package, the maximum size of the SLC buffer is set to 10 GiB, and the reservation size of the SLC buffer is set to 10 GiB if the total size of the free blocks is 128 GiB or more, or to 2.5 GiB if the total size of the free blocks is less than 128 GiB. The item for the recovery in the active idle state is set to "perform the recovery (enable)", the item for the recovery in the standby entry period is set to "perform the recovery until the size of the active area of the SLC buffer becomes zero", and the item for the recovery in the LPM entry period is set to "perform the recovery until the size of the free blocks is 5 GiB or more". The item for the recovery in the LPM period is set to "perform the recovery while the power is supplied to the whole part of the SSD 4 every 5 seconds", the item for the recovery in the TLC write operation is set to "perform the recovery with maintaining the TLC write performance at 90% or more", and the item for the recovery in the SLC write operation is set to "perform the recovery with maintaining the SLC write performance at 95% or more".

In the passive setting package, the maximum size of the SLC buffer is set to 2.5 GiB, and the reservation size of the SLC buffer is set to 2.5 GiB if the total size of the free blocks is 128 GiB or more, or 2.5 GiB if the total size of the free blocks is less than 128 GiB. The item for the recovery in the active idle state is set to "perform the recovery (enable)", the item for the recovery in the standby entry period is set to "perform the recovery until the size of the active area of the SLC buffer becomes zero", the item for the recovery in the LPM entry period is set to "not perform the recovery (disable)", the item for the recovery in the LPM period is set to "not perform the recovery (disable)", the item for the recovery in TLC write operation is set to "not perform the recovery (disable)", and the item for the recovery in SLC write operation is set to "not perform the recovery (disable)".

When the host 2 detects that the SSD 4 is connected to the host, the host 2 transmits one of the SLC buffer control information packages stored therein to the SSD 4. When the SLC buffer controller 42 receives the one of the SLC buffer control information packages, the SLC buffer controller 42 stores the one of the SLC buffer control information packages in the NAND memory 12.

If the host 2 and SSD 4 share the SLC buffer control information packages as above, when the host 2 sets the SLC buffer control information to the SSD 4, sending the setting information for each item of the SLC buffer control information to the SSD 4 is not necessary, and only the information to identify the SLC buffer control information package (for example, information identifying the aggressive package, moderate package, and passive package) should be sent. When the SLC buffer controller 42 receives this identification information, the SLC buffer controller 42 reads the SLC buffer control information package from the NAND memory 12, and sends the SLC buffer recovery parameter to the write controller 44, and sends the SLC buffer reservation parameter to the GC controller 46.

The number of examples of the SLC buffer control information packages is not limited to three, but a large number of examples with different ratios of the degree of importance placed on write performance to the degree of importance placed on reliability may be prepared.

According to the second embodiment which uses the SLC buffer control information packages as shown in FIG. 10, the usability of the SSD 4 is improved and verification costs are lowered. Using SLC buffer control information that allows the user to freely set items as shown in FIG. 3, the degree of freedom can be increased to meet any requirement.

Third Embodiment

The reservation and recovery of the SLC buffer can also be controlled by other means instead of the SLC buffer control information. In a third embodiment, the host 2 sends a program that controls the SLC buffer reservation operation to the SSD 4, and the write controller 44 performs the SLC buffer reservation according to the program.

FIG. 11 illustrates an example of an SLC buffer control program. The control program uses a timer to reserve an additional 10 GB of the dynamic SLC buffer when the idle time is 5 seconds or more. The control program adds an item to the control information of FIG. 3.

DynamicSLCBufferCredit in the control program indicates the total size of the reserved dynamic SLC buffer. IdleTime=GetIdleTime( ) in the control program means to acquire the idle time by the timer. IF (IdleTime>=5 {DynamicSLCBufferCredit=DynamicSLCBufferCredit+10 GB} indicates that an additional 10 GB of the dynamic SLC buffer is reserved if the idle time is more than 5 seconds. The control program can easily change the mode of the SLC buffer reservation by changing the values of "5 seconds" and "10 GB".

In the example of FIG. 11, a timer is used as a criterion to determine whether or not to perform a reservation operation. However, statistical information analyzing the trend of commands sent from the host 2 may be used as a criterion. The control program is not limited to add an item of the reservation parameter, but can also add an item of the recovery parameter.

Another example of the control program is shown below. This example corresponds to the item of the reservation parameter "SLC buffer reservation size: 10 GiB if the total size of the free blocks is above a threshold" in FIG. 3. CurrentFreeCluster in the control program indicates the current total size of the free blocks. TargetFreeCluster indicates the threshold of the total size of the free blocks to reserve additional dynamic SLC buffers.

```
TargetFreeCluster;.
CurrentFreeCluster;
DynamicSLCBufferCredit;
IF (CurrentFreeCluster > TargetFreeCluster) {
DynamicSLCBufferCredit = 10G;
}
```

According to the third embodiment, by controlling the reservation and recovery of the SLC buffer by the control program, it is possible to flexibly respond to situations not envisioned when designing the SSD 4. The controller 14 includes resources for interpreting and storing the program. The resources include the compiler and the memory (SRAM 26, NAND memory 12). Since the control program can be easily modified, it can also be easily adapted to change the mode of reservation and recovery of the SLC buffer.

Fourth Embodiment

A fourth embodiment related to a setting method by which the host 2 sets the SLC buffer control information in the SSD 4 will be explained. Examples of the setting method include setting by the Set Feature command, setting by a specific command, and setting by a specific signal line.

FIG. 12 illustrates an example of the Set Feature command, which uses the SLC buffer control information package to set the SLC buffer control information to the SSD 4.

In NVMe, the command is 64 KB, and the command format includes: Command Dword0 (CDW0) of bytes [03:00]; Namespace Identifier (NSID) of bytes [07:04]; Reserved of bytes [15:08]; Metadata Pointer (MPTR) of bytes [23:16]; Data Pointer (DPTR) in byte [39:24]; Command Dword10 (CDW10) of bytes [43:40]; Command Dword11 (CDW11) of bytes [47:44]; Command Dword12 (CDW12) of bytes [51:48]; Command Dword13 (CDW13) of bytes [55:52]; Command Dword14 (CDW14) of bytes [59:56]; and Command Dword15 (CDW15) of bytes [63:60].

Command Dword0 (CDW0) contains Command Identifier (CID) of bits [31:16], PRP or SGL for Data Transfer (PSDT) of bits [15:14], Reserved of bits [13:10], Fused Operation (FUSE) of bits [09:08], and Opcode (OPC) of bits [07:00].

The command Dword10 (CDW10) contains Save (SV) of bit [31], Reserved of bits [30:08], and Feature Identifier (FID) of bits [07:00].

The OPC of bits [07:00] of Command Dword0 (CDW0) is set to an opcode of Set Feature (09 h). The FID of bits [07:00] of Command Dword10 (CDW10) is set to Vendor Specific (one of C0 h-FFh, C0 h in this example).

The identification information of the SLC buffer control information package is set in Command Dword11 (CDW11). For example, the identification information for the moderate package is 0×0, the identification information for the aggressive package is 0×1, the identification information for the passive package is 0×2, and the other information is Reserved.

By sending such a Set Feature command from the host 2 to the SSD 4, the identification information of the SLC buffer control information package is sent to the SLC buffer controller 42. The SLC buffer controller 42 reads the SLC buffer control information package from the NAND memory 12 based on this identification information, sends the SLC buffer recovery parameter to the write controller 44, and sends the SLC buffer reservation parameter to the GC controller 46.

The Set Feature command is not limited to send the identification information of the SLC buffer control information package, but can also send the SLC buffer control information itself, as shown in FIG. 3. In this case, Commands Dword11 (CDW11) to Dword15 (CDW15) are set with information indicating each of the items of the reservation parameter and the recovery parameter.

In both a case where the setting is performed by a specific command and a case where the setting is performed by a specific signal line, the setting can be done as in the case where the setting is performed by the Set Feature command.

Now, the timing for setting the SLC buffer control information by the host 2 will be explained. The setting timing can be at the time when the SSD 4 is powered on or after the SSD 4 is powered-on.

Figure 13:
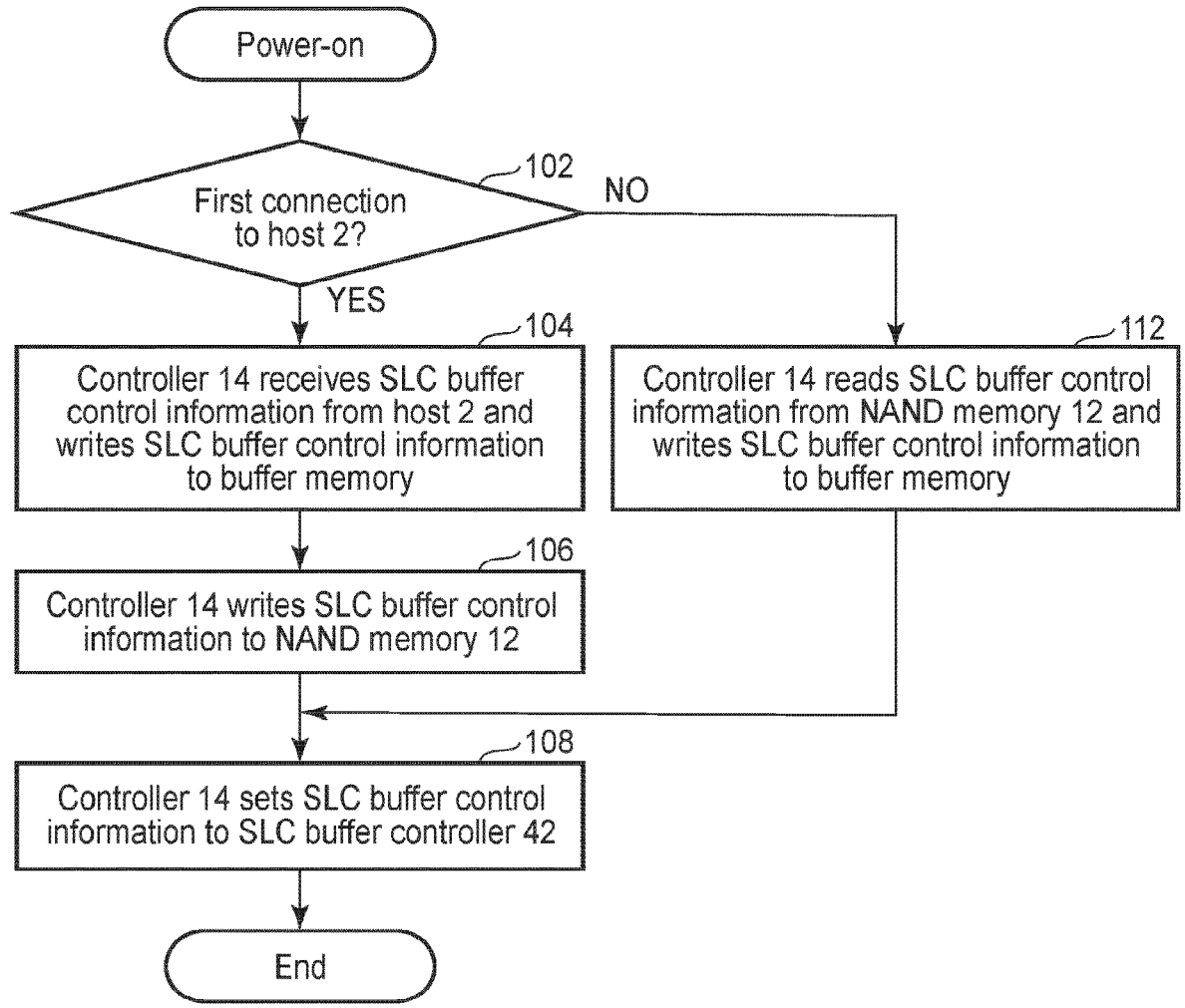

FIG. 13 is a flowchart of an example of a process by which the controller 14 sets the SLC buffer control information to the SLC buffer controller 42 when the SSD 4 is powered on. FIG. 13 illustrates the process performed by the BIOS which is performed when the CPU 30 is powered-on. In this example, the default SLC buffer control information of the SSD 2 is stored in the NAND memory 12.

In step 102, the controller 14 determines whether or not it is the first connection to the host 2. If it is the first connection (Yes in step 102), the controller 14 receives the SLC buffer control information from the host 2 and writes the SLC buffer control information to a buffer memory (not shown) in the DRAM 16 in step 104. When the host 2 detects a connection with the SSD 4, the host 2 sends the SLC buffer control information stored therein to the SSD 4.

In step 106, the controller 14 writes the SLC buffer control information in the buffer memory to the NAND memory 12. The controller 14 may overwrite the SLC buffer control information on the default SLC buffer control information, or store the information separately from the default SLC buffer control information.

If it is not the first connection (No in step 102), in step 112, the controller 14 reads the SLC buffer control information from the NAND memory 12, and writes the SLC buffer control information to the buffer memory in the DRAM 16.

After performing step 106 or step 112, in step 108, the controller 14 sets the SLC buffer control information in the buffer memory to the SLC buffer controller 42.

According to the fourth embodiment, when the SSD 4 is first connected to the host 2, the controller 14 receives the SLC buffer control information from the host 2 and can rewrite the default SLC buffer control information. The controller 14 sets the SLC buffer control information received from the host 2 to the SLC buffer controller 42 and writes the received information to the NAND memory 12. Thus, the controller 14 can store the SLC buffer control information received from the host 2 in a nonvolatile manner. When connecting with host 2 for the second or subsequent time, the controller 14 reads the SLC buffer control information from the NAND memory 12, and sets the read information to the SLC buffer controller 42.

Note that, not only at the time of the power-on of the SSD 4, but also after the power-on, a utility tool application program may be started to read the SLC buffer control information from the NAND memory 12 via an NVMe driver and set the SLC buffer control information to the SLC buffer controller 42.

Fifth Embodiment

In the aforementioned explanation, the SLC buffer control information once set by the host 2 is unchanged. However, in a fifth embodiment, a user may change the SLC buffer control information according to the actual operation of the SSD 4. To achieve this, the SSD 4 sends feedback information to the host 2 that indicates a write performance and power consumption, a reliability, and a stability of write performance which represent the operation state of the SSD 4.

FIG. 14 illustrates an example of feedback information. The feedback information includes at least one of an item indicative of write performance and power consumption, item indicative of reliability, and item indicative stability of write performance. The item indicative of write performance and power consumption is information of the SLC buffer usage period or the SLC buffer usage frequency, and includes at least one of the following: an amount of data written to the static SLC buffer, an amount of data written to the dynamic SLC buffer, an amount of date written by the TLC write operation, an amount of free blocks recovered from the static SLC buffer, and an amount of free blocks recovered from the dynamic SLC buffer.

The item indicative of reliability includes at least one of the following: an amount of data written by the host write operation and an amount of data written by the NAND write operation (WAF).

The item indicative of performance stability includes an amount of data written by the GC operation.

The above amounts are cumulative values since the SSD 4 is first powered-on.

The host 2 displays the received feedback information on a display (not shown). By referring to the feedback information on the display, the user can determine whether the set SLC buffer control information achieves an expected write performance and power consumption, an expected reliability, or an expected stability of write performance.

FIG. 15 is a flowchart of an example of a process by which the SLC buffer control information is changed based on the feedback information from the SSD 4. In step 202, the host 2 sends a feedback information request command to the SSD 4. Step 202 may be performed at a certain time after sending the SLC buffer control information to the SSD 4, at a certain cycle after sending the SLC buffer control information, or at a timing specified by the user.

The feedback information request command can be realized by a specific vendor-dependent command. For example, if a command such as SMART information request command is sent to the SSD 4, the SSD 4 sends the feedback information (FIG. 14) to the host 2.

In step 204, the host 2 receives the feedback information from the SSD 4, and displays it on the display. In step 206, the user determines whether or not the expected write performance and power consumption, the expected reliability, and the excepted stability of write performance have been achieved by referring to the displayed feedback information. If the expected write performance and power consumption, the expected reliability, and the expected stability of write performance are achieved (Yes in step 206), there is no need to change the SLC buffer control information, and the process ends.

If the expected write performance and power consumption, the expected reliability, or the expected stability of write performance is not achieved (No in step 206), in step 208, the user changes one of the items of the reservation parameter and the recovery parameter in the SLC buffer control information. In step 212, the host 2 sends the changed SLC buffer control information to the SSD 4.

Thereafter, at an execution timing of step 202, the host 2 sends a feedback information request command to the SSD 4. Then, in the same manner as above, it is determined whether or not the expected write performance and power consumption, the expected reliability, and the expected stability of write performance have been achieved, and if the expected write performance and power consumption, the expected reliability, or the expected stability of write performance has not been achieved, the SLC buffer control information is further changed.

Thus, the expected write performance and power consumption, the expected reliability, and the expected stability of write performance are achieved by changing the SLC buffer control information.

Examples of changing the SLC buffer control information in step 208 will be explained below.

EXAMPLE 1

In this example, a user feels that the SLC buffer usage period is shorter than an expected period or that the SLC buffer usage frequency is lower than an expected frequency while the SLC buffer controller 42 is reserving and recovering the SLC buffer based on the SLC buffer control information. The user gives the host 2 a trigger to execute step 202 of FIG. 14, and causes the host 2 to send the feedback information request signal to the SSD 4. The feedback information request signal is displayed on the display of the host 2. The user recognizes, from the feedback information displayed on the display of the host 2, that the amount of data written to the dynamic SLC buffer and the amount of free blocks recovered from the dynamic SLC buffer are small. The user recognizes that the reason why the SLC buffer usage period is shorter than the expected period or the SLC buffer usage frequency is lower than the expected frequency is that the amount of free blocks recovered from the dynamic SLC buffer is small. In the current SLC buffer control information, the item for recovery in the LPM operation in the recovery parameter specifies that the recovery should be performed with maintaining the average power less than 5 mW. The user may increase the allowable average power of the recovery in the LPM period operation from 5 mW to 100 mW in order to increase the amount of free blocks recovered from the dynamic SLC buffer.

EXAMPLE 2

In this example, the SLC buffer controller 42 has performed the reservation and recovery of the SLC buffer for one year based on the default SLC buffer control information. The default SLC buffer control information improves the write performance. For example, in the default SLC buffer control information, the maximum size of the SLC buffer in the reservation parameter is set to 10 GB, and each item in the recovery parameter is set to perform the recovery more frequent. The user gives the host 2 a trigger to execute step 202 in FIG. 14, and causes the host 2 to send a feedback information request signal to the SSD 4. From the feedback information displayed on the display of the host 2, the user finds that the amount of data written in the NAND write operation is very large compared to the amount of data written by the host write operation, that is, the WAF is large. The user wishes to improve the reliability. In that case, the user may reduce the maximum size of the SLC buffer in the reservation parameter from 10 GB to 1 GB, and send SLC buffer control information to the SSD 4 such that the recovery is not performed except during the active idle period.

EXAMPLE 3

In this example, while the SLC buffer controller 42 is reserving and retrieving SLC buffers based on the SLC buffer control information, a user feels that even though the SLC buffer usage period is shorter than the expected period or the SLC buffer usage frequency is lower than expected frequency, the power consumption by the SSD 4 is great, and the battery consumption of the host 2 is great. In such a case, the user gives the host 2 a trigger to execute step 202 of FIG. 14 which causes the host 2 to send a feedback information request signal to the SSD 4. From the feedback information displayed on the display of the host 2, the user finds that the amount of free blocks recovered from the static SLC buffer is large. The user recognizes that the cause of the high battery consumption is the fact that the recovery is being performed during the LPM period. In this case, the user may change the SLC buffer control information so that the recovery is not performed during the LPM period.

According to the fifth embodiment, the controller 14 reserves and recovers the SLC buffer based on the SLC buffer control information set by the user and supplied from the host 2. Since the period and frequency of host write in the SLC mode are changed based on the size of the SLC buffer, users can control the write performance of the SSD 4. Thus, the SSD 4 can provide the performance required by both the users who wishes to improve the write performance and who wishes to improve the reliability. Since the SLC buffer control information contains many settable items, users can adjust the degree of write performance or reliability in many levels. Furthermore, instead of the user setting the items of the SLC buffer control information, multiple SLC buffer control information packages may be prepared in advance according to the degree of performance considered important. In this case, a user can easily set the SLC buffer control information by simply selecting a package. The SSD 4 may feedback the operation status to the host 2. The user can determine whether the reservation and recovery of the SLC buffer is performed to achieve the expected write performance or reliability based on the SLC buffer control information. If the user changes the setting values of the items of the SLC buffer control information according to the result of this determination, the user can achieve the expected write performance or reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A storage device comprising:
a nonvolatile memory including a plurality of blocks that are divided into a user capacity and an overprovisioning capacity; and
a controller configured to perform a first data write operation in a first mode for a block of a first block group, and to perform a second data write operation in a second mode for a block of a second block group, wherein
data of a first number of bits is written per memory cell in the first mode,
data of a second number of bits is written per memory cell in the second mode,
the second number is larger than the first number, and
the controller is configured to
reserve one or more free blocks in the plurality of blocks as write destination block candidates of the first data write operation, the reserved one or more free blocks being assigned from among the user capacity and the overprovisioning capacity, and a part of the first block group being a dedicated block as a static buffer and being provided in the overprovisioning capacity,
perform the first data write operation for one of the write destination block candidates, and perform a garbage collection operation based on first control information received from an external device for an active block or blocks of the first block group and the second block group.

2. The storage device of claim 1, wherein the first control information is configured to indicate whether the garbage collection operation is performed or not.

3. The storage device of claim 1, wherein the first control information is configured to indicate how the garbage collection operation is performed or that the garbage collection operation is not performed.

4. The storage device of claim 1 wherein the first control information is configured to indicate whether the garbage collection operation is performed or not in an active idle period.

5. The storage device of claim 1, wherein the first control information is configured to indicate that the garbage collection operation is performed in a standby entry period until the active block no longer exists, the garbage collection operation is performed in the standby entry period until a total size of free blocks becomes a certain size or more, or the garbage collection operation is not performed in the standby entry period.

6. The storage device of claim 1, wherein the first control information is configured to indicate that the garbage collection operation is performed in a low power mode entry period until the active block no longer exists, the garbage collection operation is performed in the low power mode entry period until a total size of free blocks becomes a certain size or more, the garbage collection operation is performed in the low power mode entry period for a first period of time after a low power mode transition response, the garbage collection operation is performed in the low power mode entry period with maintaining a power consumption less than a first power after the low power mode transition response, or the garbage collection operation is not performed in the low power mode entry period.

7. The storage device of claim 1, wherein the first control information is configured to indicate that the garbage collection operation is performed in a low power mode period for every second period of time, the garbage collection operation is performed in the low power mode period with maintaining a power consumption less than a second power, or the garbage collection operation is not performed in the low power mode period.

8. The storage device of claim 1, wherein the first control information is configured to indicate that the garbage collection operation is performed with maintaining a write performance at a first percent or more in the first data write operation, or the garbage collection operation is not performed in the first data write operation.

9. The storage device of claim 8, wherein a default write performance or a write performance if no garbage collection operation is performed is set to 100 percent.

10. The storage device of claim 1, wherein the first control information is configured to indicate that the garbage collection operation is performed with maintaining a write performance less at a second percent of more in the second data write operation, or the garbage collection operation is not performed in the second data write operation.

11. The storage device of claim 10, wherein a default write performance or a write performance if no garbage collection operation is performed is set to 100 percent.

12. The storage device of claim 1, wherein the controller is configured to reserve, based on second control information received from the external device, one or more free blocks in the plurality of blocks as the write destination block candidates of the first data write operation.

13. The storage device of claim 12, wherein the second control information is configured to indicate that the one or more free blocks are reserved as the write destination block candidates with maintaining a total size of the write destination block candidates at a first size.

14. The storage device of claim 12, wherein the second control information is configured to indicate that the one or more free blocks are reserved as the write destination block candidates with maintaining a sum of a total size of the write destination block candidates of the first data write operation and a total size of the active block or blocks at a second size.

15. The storage device of claim 1, wherein
the controller comprises a first controller, a second controller, and a third controller,
the first controller is configured to reserve the one or more free blocks,
the second controller is configured to perform the first data write operation and the second data write operation, and
the third controller is configured to perform the garbage collection operation.

16. The storage device of claim 15, wherein
the first controller is configured to receive the first control information and transmit the first control information to the third controller.

17. The storage device of claim 15, wherein
the second controller is configured to perform the second write operation when the third controller performs the garbage collection operation.

18. The storage device of claim 15, wherein
the first controller is configured to provide an interface for setting the first control information to the external device.

19. The storage device of claim 15, wherein
the third controller is configured to perform the garbage collection operation by designating a plurality of blocks in the second block group in which invalid and valid data are stored as garbage collection source blocks.

20. The storage device of claim 1, wherein
each of the plurality of blocks is assigned to the block of the first block group or the block of the second block group.

21. A storage system comprising:
a storage device; and
a host connected to the storage device, wherein
the storage device comprises:
a nonvolatile memory including a plurality of blocks that are divided into a user capacity and an overprovisioning capacity; and
a controller configured to perform a first data write operation in a first mode for a block of a first block group, and to perform a second data write operation in a second mode for a block of a second block group, wherein
data of a first number of bits is written per memory cell in the first mode,
data of a second number of bits is written per memory cell in the second mode,
the second number is larger than the first number, and
the controller is configured to
reserve one or more free blocks in the plurality of blocks as write destination block candidates of the first data write operation, the reserved one or more free blocks being assigned from among the user capacity and the overprovisioning capacity, and a part of the first block group being a dedicated block as a static buffer and being provided in the overprovisioning capacity, perform the first data write operation for one of the write destination block candidates, and perform a garbage collection operation for an active block or blocks of the first block group and the second block group, the host is configured to transmit control information of the garbage collection operation to the controller, and the controller is configured to control the garbage collection operation based on the control information.

22. A storage device comprising:

a nonvolatile memory including a plurality of blocks that are divided into a user capacity and an overprovisioning capacity; and a controller configured to perform a first data write operation in a first mode for a block of a first block group, and to perform a second data write operation in a second mode for a block of a second block group, wherein data of a first number of bits is written per memory cell in the first mode, data of a second number of bits is written per memory cell in the second mode, the second number is larger than the first number, and the controller is configured to perform a reserve operation to reserve one or more free blocks in the plurality of blocks as write destination block candidates of the first data write operation, the reserved one or more free blocks being assigned from among the user capacity and the overprovisioning capacity, and a part of the first block group being a dedicated block as a static buffer and being provided in the overprovisioning capacity, perform the first data write operation for one of the write destination block candidates, perform a garbage collection operation for an active block or blocks of the first block group and the second block group, and receive control information from an external device, the control information related to at least one of the reserve operation and the garbage collection operation.

23. The storage device of claim 22, wherein the controller comprises a first controller, a second controller, and a third controller, the first controller is configured to perform the reserve operation, the second controller is configured to perform the first data write operation and the second data write operation, and the third controller is configured to perform the garbage collection operation.

24. The storage device of claim 23, wherein the first controller is configured to receive the first control information and transmit the first control information to the third controller.

25. The storage device of claim 23, wherein the second controller is configured to perform the second write operation when the third controller performs the garbage collection operation.

26. The storage device of claim 23, wherein the first controller is configured to provide an interface for setting the first control information to the external device.

27. The storage device of claim 23, wherein the third controller is configured to perform the garbage collection operation by designating a plurality of blocks in the second block group in which invalid and valid data are stored as garbage collection source blocks.

28. The storage device of claim 22, wherein each of the plurality of blocks is assigned to the block of the first block group or the block of the second block group.

29. A control method for a storage device comprising a nonvolatile memory including a plurality of blocks that are divided into a user capacity and an overprovisioning capacity; and a controller configured to perform a first data write operation in a first mode for a block of a first block group, and to perform a second data write operation in a second mode for a block of a second block group, wherein data of a first number of bits is written per memory cell in the first mode, data of a second number of bits is written per memory cell in the second mode, and the second number is larger than the first number, the method comprising:

reserving, by the controller, one or more free blocks in the plurality of blocks as write destination block candidates of the first data write operation, the reserved one or more free blocks being assigned from among the user capacity and the overprovisioning capacity, and a part of the first block group being a dedicated block as a static buffer and being provided in the overprovisioning capacity, performing, by the controller, the first data write operation for one of the write destination block candidates, and performing, by the controller, a garbage collection operation based on first control information received from an external device for an active block or blocks of the first block group and the second block group.

30. The method of claim 29, wherein the first control information is configured to indicate whether the garbage collection operation is performed or not.

31. The method of claim 29, wherein the first control information is configured to indicate how the garbage collection operation is performed or that the garbage collection operation is not performed.

32. The method of claim 29, wherein the first control information is configured to indicate whether the garbage collection operation is performed or not in an active idle period.

33. The method of claim 29, wherein the first control information is configured to indicate that the garbage collection operation is performed in a standby entry period until the active block no longer exists, the garbage collection operation is performed in the standby entry period until a total size of free blocks becomes a certain size or more, or the garbage collection operation is not performed in the standby entry period.

34. The method of claim 29, wherein the first control information is configured to indicate that the garbage collection operation is performed in a low power mode entry period until the active block no longer exists, the garbage collection operation is performed in the low power mode entry period until a total size of free blocks becomes a certain size or more, the garbage collection operation is performed in the low power mode entry period for a first period of time after a low power mode transition response, the garbage collection operation is performed in the low power mode entry period with maintaining a power consumption less than a first power after the low power mode transition response, or the garbage collection operation is not performed in the low power mode entry period.

35. The storage device of claim 29, wherein the first control information is configured to indicate that the garbage collection operation is performed in a low power mode period for every second period of time, the garbage collection operation is performed in the low power mode period with maintaining a power consumption less than a second power, or the garbage collection operation is not performed in the low power mode period.

36. The method of claim 29, wherein the first control information is configured to indicate that the garbage collection operation is performed with maintaining a write performance at a first percent or more in the first data write operation, or the garbage collection operation is not performed in the first data write operation.

37. The method of claim 36, wherein a default write performance or a write performance if no garbage collection operation is performed is set to 100 percent.

38. The method of claim 29, wherein the first control information is configured to indicate that the garbage collection operation is performed with maintaining a write performance less at a second percent of more in the second data write operation, or not to perform the garbage collection operation in the second data write operation.

39. The method of claim 38, wherein a default write performance or a write performance if no garbage collection operation is performed is set to 100 percent.

40. The method of claim 29, wherein the controller is configured to reserve, based on second control information received from the external device, one or more free blocks in the plurality of blocks as the write destination block candidates of the first data write operation.

41. The method of claim 40, wherein the second control information is configured to indicate that the one or more free blocks are reserved as the write destination block candidates with maintaining a total size of the write destination block candidates at a first size.

42. The method of claim 40, wherein the second control information is configured to indicate that the one or more free blocks are reserved as the write destination block candidates with maintaining a sum of a total size of the write destination block candidates of the first data write operation and a total size of the active block or blocks at a second size.

* * * * *